(12) United States Patent
Alexander

(10) Patent No.: US 9,419,988 B2
(45) Date of Patent: Aug. 16, 2016

(54) SYSTEM AND METHOD FOR NON-DISRUPTIVE MITIGATION OF MESSAGING FRAUD

(71) Applicant: Vonage Business Inc., Atlanta, GA (US)

(72) Inventor: Jonathan Alexander, Roswell, GA (US)

(73) Assignee: VONAGE BUSINESS INC., Atlanta, GA (US)

(*) Notice: Subject to any disclaimer, the term of this patent is extended or adjusted under 35 U.S.C. 154(b) by 0 days.

(21) Appl. No.: 14/473,289

(22) Filed: Aug. 29, 2014

(65) Prior Publication Data

US 2015/0026786 A1   Jan. 22, 2015

Related U.S. Application Data

(63) Continuation-in-part of application No. 14/169,385, filed on Jan. 31, 2014.

(60) Provisional application No. 61/837,606, filed on Jun. 20, 2013.

(51) Int. Cl.
*H04M 15/00*   (2006.01)
*H04L 29/06*   (2006.01)
*H04W 12/12*   (2009.01)
(Continued)

(52) U.S. Cl.
CPC ............ *H04L 63/1408* (2013.01); *H04L 63/08* (2013.01); *H04M 3/42314* (2013.01); *H04M 3/436* (2013.01); *H04M 7/0078* (2013.01); *H04W 12/12* (2013.01)

(58) Field of Classification Search
CPC ....... H04W 11/12; G06F 21/45; H04L 63/14; H04L 63/1425; H04L 67/22
USPC ......... 379/88.22, 88.25, 114.14, 121.01, 143, 379/144.03, 91.01, 91.02; 455/410, 411; 705/14.26, 14.47; 713/168, 182, 183, 713/184, 185; 726/2, 3, 4, 5, 7
See application file for complete search history.

(56) References Cited

U.S. PATENT DOCUMENTS 5,345,595 A * 9/1994 Johnson .............. H04L 63/1416
379/189
5,495,521 A   2/1996 Rangachar
(Continued)

OTHER PUBLICATIONS

Peder Jungck, VoIP Fraud: Scenarios and Solutions, Internet Telephony Magazine, Mar. 2006, pp. 115-117, vol. 9—No. 3, A Technology Marketing Publication, Norwalk, CT, U.S.A.

*Primary Examiner* — Binh Tieu
(74) *Attorney, Agent, or Firm* — Alexander Legal LLC; Joseph Pagnotta

(57) ABSTRACT

A system and method are disclosed herein for providing mitigation of fraud in a hosted messaging service while having minimal impact on authorized messaging users. The method includes a system for detecting potential fraud based on multiple and configurable fraud indicators as well as historical data, which can be customized for individual users or groups. The system can terminate in-process messages that are potentially fraudulent and reset the network access credentials for the affected user accounts or devices that have been potentially compromised. The system uses historical data to block further messages from the compromised user accounts or devices to specific destination addresses where the presumed fraudulent messaging activity was directed. In a further aspect, the system and method can automatically reset the network access credentials for authorized users with minimal downtime.

19 Claims, 7 Drawing Sheets

(51) Int. Cl.
*H04M 3/42* (2006.01)
*H04M 3/436* (2006.01)
*H04M 7/00* (2006.01)

(56) References Cited

U.S. PATENT DOCUMENTS

| | | | | |
|---|---|---|---|---|
| 5,729,597 A * | 3/1998 | Bhusri | ................ | H04M 3/2254 379/112.01 |
| 5,950,121 A | 9/1999 | Kaminsky et al. | | |
| 7,142,651 B2 | 11/2006 | Ronen et al. | | |
| 7,248,681 B2 * | 7/2007 | Betts | ................ | H04L 63/14 379/114.14 |
| 7,574,202 B1 * | 8/2009 | Tsao | ................ | H04L 63/0272 370/310 |
| 7,653,188 B2 * | 1/2010 | Kloberdans et al. | .......... | 379/145 |
| 8,340,259 B2 * | 12/2012 | Mahone | ................ | G06F 21/55 379/114.02 |
| 8,737,962 B2 * | 5/2014 | Ballai | ................ | H04W 12/12 455/405 |
| 2004/0063424 A1 | 4/2004 | Silberstein et al. | | |
| 2007/0005984 A1 * | 1/2007 | Florencio | ................ | H04L 63/14 713/178 |
| 2009/0213844 A1 * | 8/2009 | Hughston | ........... | H04M 3/4872 370/352 |
| 2011/0138462 A1 | 6/2011 | Kim et al. | | |
| 2011/0142217 A1 * | 6/2011 | Goldfarb | ................ | 379/126 |
| 2011/0149955 A1 | 6/2011 | Petillo et al. | | |
| 2012/0213082 A1 | 8/2012 | Carney et al. | | |
| 2014/0045456 A1 * | 2/2014 | Ballai et al. | ................ | 455/410 |
| 2014/0075524 A1 * | 3/2014 | Ho et al. | ................ | 726/6 |
| 2014/0123228 A1 * | 5/2014 | Brill | ................ | H04L 63/1416 726/4 |
| 2014/0226803 A1 * | 8/2014 | Ballai | ................ | H04W 12/12 379/114.14 |

* cited by examiner

SYSTEM AND METHOD FOR NON-DISRUPTIVE MITIGATION OF MESSAGING FRAUD

CROSS-REFERENCE TO RELATED APPLICATIONS

This application is a continuation-in-part of U.S. application Ser. No. 14/169,385, filed Jan. 31, 2014; which claims the benefit of U.S. Provisional Application No. 61/837,606, filed Jun. 20, 2013.

FIELD OF THE INVENTION

The present invention relates generally to mitigating fraudulent activity in an Internet-based or telephony-based messaging system and, more particularly, to methods and systems for providing messaging fraud mitigation in a Short Message Service (SMS), Multimedia Messaging Service (MMS) or other Internet-based messaging system, in a manner that is effective, yet minimally disruptive, to an authorized user.

BACKGROUND OF THE INVENTION

A Private Branch Exchange (PBX) is a telephone exchange that makes connections among the internal telephones of an organization, such as a private business or telephone network. The PBX allows these internal telephones to connect to the public switched telephone network (PSTN) via trunk lines and/or the Internet. A hosted PBX system delivers PBX functionality as a service, available over the PSTN and/or the Internet. A telephone company typically provides hosted PBXs using equipment located on the premises of the telephone company's exchange. In a hosted PBX system, the customer organization does not need to buy or install PBX equipment and the telephone company can use the same switching equipment to service multiple PBX hosting accounts. Furthermore, Voice over Internet Protocol (VoIP) gateways can be combined with traditional PBX functionality enabling businesses and organizations to use their managed Internet/Intranet to help reduce long distance expenses and to enjoy the benefits of a single network for voice and data, which gives greater cost savings, mobility and increased redundancy.

Like other Internet-based computer systems, VoIP PBXs have become a target for Internet-based fraud. A hacker, one who compromises a VoIP PBX often by obtaining the Session Initiation Protocol (SIP) credentials of a VoIP telephony device of an authorized user, can place fraudulent phone calls through the VoIP PBX to any destination. Such fraudulent phone calls can sometimes incur large phone bills when placed to international locations. Such VoIP fraud may result in financial liabilities owed by an authorized user or the VoIP PBX service provider to the call carriers who terminate these calls. A successful hacker can use illicitly obtained credentials to place numerous calls in a matter of minutes that can run up thousands of dollars in fraudulent VoIP calls through a VoIP PBX.

Like VoIP, Short Message Service (SMS) or Multimedia Messaging Service (MMS), each referred to hereinafter also as "messaging services," are services that may be offered by phone, Internet and mobile communications systems. Messaging services utilize standardized communications protocols to allow fixed line, mobile phone, or other computing devices to exchange short text messages. SMS, as used on modern handsets, originated from radiotelegraphy in radio memo pagers using standardized phone protocols. These were defined in 1985 as part of the Global System for Mobile Communications (GSM) series of standards as a means of sending messages of up to 160 characters to and from GSM mobile handsets. Though most SMS messages are mobile device to mobile device text messages, support for the service has expanded to include other mobile technologies, such as American Nation Standards Institute (ANSI), Code Divisional Multiple Access (CDMA) networks, and Digital Advanced Mobile Phone System (AMPS) networks, as well as satellite and landline networks.

SMS and MMS messaging gateways and services can be combined with traditional PBX functionality enabling businesses and organizations to use their managed Internet/Intranet to help reduce expenses and to enjoy the benefits of a single network for voice and data. This allows VoIP service providers to offer their subscribers messaging services such as SMS and MMS. A VoIP service provider can offer these messaging services utilizing a softphone application on a computing device, mobile device or Session Initiation Protocol (SIP) phone system. In many instances the VoIP service provider will offer this feature in a mobile device application format.

Messaging services such as SMS have become a huge commercial industry, earning communications service providers billions of dollars in revenues each year. However, these messaging services have inherent security vulnerabilities and shortcomings and are often the targets of fraudulent attacks. Given the huge potential financial liability to a service provider who may be subject to such attacks, there exists a need to eliminate or mitigate messaging services fraud.

There are several types of messaging fraud. These include Spamming cases, Flooding cases, Faking cases, and Spoofing cases, among others. Spamming occurs when the subscriber receives an unsolicited SMS or MMS. The act of spamming is similar to receiving spam emails in an email account. It is not defined by the content of the message, but the mere fact that the user did not request or solicit the message. The content of the spam message is incidental to the act. However, it is important to note the message could have been sent from a valid originator and, therefore, may be correctly billed to the sender.

Another instance of messaging fraud occurs when a large number of messages are sent to one or more destinations, effectively "flooding" the networks. This is referred to as SMS flooding. SMS flooding occurs when the volume of messages originating from a user account becomes so large it effectively overwhelms the network. This can lead to problems such as service outages for other users. This is usually identified when the number of messages originating from an account far exceeds the usual number of messages sent within a specific time period.

While the types of fraud described above may be annoying, what is of particular concern to VoIP and telephony service providers is fraud that results in service cost to the service providers or to their subscribers, including SMS/MMS Faking (message faking) and SMS/MMS Spoofing (message spoofing). Message faking occurs when the Skinny Client Control Protocol (SCCP—a lightweight protocol for session signaling between Internet protocol devices and wireless call managers) or the Media Access Protocol (MAP) address associated with a subscriber's account is manipulated. The SCCP or MAP address may be entered incorrectly or taken from a valid originator using methods such as GT Scanning, described below. For example, when a user sends an SMS or MMS message, a message packet is generated by the user's device and initially forwarded over the user's network to a Mobile Switching Center (MSC) employed by the (originating) user's network. The MSC analyzes the message packet and uses the SCCP or MAP address of the user account that originated the message for authentication. The MSC also uses the message packet to determine the current switching network with which the destination user account is registered. The MSC then pings the switching network of the destination account for protocol routing information for the message. A Home Location Register (HLR) at the destination address responds to the originating MSC with the routing information for the receiving user device. The originating MSC then sends the actual text of the message to the MSC for the receiving network. The MSC for the receiving network confirms receipt. Fraud can occur when, although the originating MSC functions as normal, the SCCPs or MAP addresses are "hacked" and manipulated such that the source address is changed during the transmission of the "actual message" to the receiving user. This causes an accounting error because the financial cost associated with sending the message is charged to the account associated with the "hacked" source address. Therefore, the charges are placed against the account associated with this changed source address. This could result in huge charges against a subscriber or service provider if the hacker chooses to fake an authorized user's legitimate account and flood the network with messages.

Message faking can also occur if the user has a computing device application that can send messages on behalf of the user. Some hosted systems have an application programming interface (API) for sending messages that requires user authentication in order to use the API. If a hacker obtains these user credentials for either the application or the API, then a hacker can send fraudulent messages and also possibly create an incident of SMS flooding as described above. In this case, the hacker does not need to manipulate the SCCP or the MAP address of the message, and so this kind of hacking may be simpler and more commonplace, thereby potentially creating an even larger threat to a telephony service provider.

Similar to message faking, the messages can also be spoofed. Message spoofing occurs when a hacker or other entity manipulates the SCCP or MAP address of a message to make it appear to be a legitimate message from a device that is roaming on another network. The hacker manipulates the routing information in the message such that it appears to be originating from a foreign Visitor Location Register (VLR). The VLR is used to maintain a record of "foreign" mobile devices that are roaming on another carrier's network. When message spoofing is occurring, the hackers are using a user's account identifiers to essentially "clone" a user's identity within a telephony service provider's network. This "cloned" identity allows the hacker to appear to the user's Home Public Land Mobile Network (HPLMN) as the legitimate user. The HPLMN assumes the "cloned" user identity is the legitimate user roaming on another service provider's network and engaging in "legitimate" messaging activity using that network. Given that all the account identifying information provided by the VLR is correct, the HPLMN will authenticate and authorize the message transfer. From the HPLMN point of view, the message is originating from a legitimate user that is roaming on a third-party network with their device. However, it is in fact not a real subscriber, but a "clone" that has been generated by a hacker. The hacker effectively uses these techniques to trick the HPLMN into assuming that an authorized user is generating the message, and the message is then forwarded to a receiver. The message is then billed to the spoofed or "cloned" user account.

A hacker can also utilize GT Scanning, which uses special equipment to conduct a bulk scan of message service centers, to identify non-secure, vulnerable message service centers and mobile devices in order to commit any of the types of fraud described above.

Multiple solutions have been devised to detect potential VoIP and messaging fraud through a VoIP PBX or VoIP service providers. These fraud mitigation solutions are necessary because any interruption of calling or messaging services for a user can represent an intolerable business disruption with serious financial consequences, as many businesses and users rely on VoIP PBX and messaging services for all their communications. Therefore, telephone and messaging services are mission critical for many businesses. Thus, the need exists for a system and method that effectively mitigates financial liability of both VoIP and messaging fraud while being minimally disruptive to the communications of authorized users.

The present invention meets one or more of the above-referenced needs as described herein in greater detail.

SUMMARY OF THE INVENTION

The present invention relates generally to mitigating fraudulent activity in an Internet-based or telephony-based messaging system and, more particularly, to methods and systems for providing messaging fraud mitigation in a Short Message Service (SMS), Multimedia Messaging Service (MMS) or other Internet-based messaging system, in a manner that is effective, yet minimally disruptive, to an authorized user.

In a first aspect, the present embodiment provides a method for fraud mitigation executable on a computing device. The method accesses configurable data to define a plurality of fraud indicators. The method then dynamically monitors a user device or account to identify fraudulent messaging or calling activity based on the one or more of the plurality of defined fraud indicators. Upon a determination that fraudulent messaging or calling activity is occurring or has recently occurred on an affected user device or account, a fraud mitigation action is applied. Fraud mitigation actions may be chosen from at least one of call or message termination, call or message blocking or reissuing network access credentials for the affected user device or account.

In a further aspect, a fraud mitigation system executable on a computing device is disclosed. The fraud mitigation system accesses a connected storage component comprising configurable data for defining a plurality of fraud indicators. The computing device executes a fraud monitoring service for dynamically monitoring a user account or device to identify fraudulent messaging or calling activity based on the defined fraud indicators. Upon a determination that fraudulent messaging or calling activity is occurring or has recently occurred on a user device or account, at least one fraud mitigation service is employed. The fraud mitigation services include a message or call termination system, a credential reset service, and a destination blocking service. The message or call termination service terminates an identified fraudulent call or message occurring on the affected user device or account. The credential reset service reissues new network access credentials to the affected user device or account. The destination blocking service blocks future calls from the affected user device or account to a location identified in the fraudulent messaging or calling activity.

In a further aspect, the present embodiment provides a system and method for VoIP fraud mitigation for a VoIP PBX system. The system and method also provides a method for messaging fraud mitigation for Short Message Service (SMS) and Multimedia Messaging Service (MMS) messages. The fraud detection service relies on configuration data from a connected storage component, which defines fraud indicators that can be set based on accumulated number of calls, the type of calls, and/or the cost of the calls. Similarly, the fraud indicators can be set based on an accumulated number of messages, the type of messages, and/or the cost of the messages. The types of calls may include long-distance calls, international calls, and/or other toll calls. The fraud indicators can be defined and set based on specific time periods, number of calls or messages placed during a specific time period, and number of calls or messages placed from a specific user or group of users.

In a further aspect, the present embodiment provides a system and method for VoIP fraud mitigation for a hosted VoIP PBX system wherein the Call Termination Service can force the termination of live calls in a variety of ways including through an API made available by the VoIP PBX with call control capabilities and through interaction and manipulation of an Edge Server or a network device through which SIP and VoIP communications pass to or from the VoIP PBX.

Similar to the VoIP fraud mitigation described above, the present embodiment provides a Message Termination Service that can force the termination of active outgoing messages through an API made available by the fraud monitoring service to a mobile switching center, message service center, or to a user device and/or account.

The system comprises a messaging system network for transmitting and receiving communication messages for a user account. The messaging system network comprises at least one of a provisioning server provided to issue authentication credentials to the user account. The provisioning server is coupled to a message log database that logs records of message communications. The message log database is coupled to a mobile switching center that has been provided to route message communications for a user account. The mobile switching center is coupled to a Message Service Center that is provided to connect the messaging system network with a communications network. The messaging system network is communicatively coupled to a fraud monitoring unit.

Further in the embodiment, the system provides a fraud monitoring service to detect instances of fraudulent messaging activity occurring within the messaging system network. The fraud monitoring unit comprises a fraud indicator configuration database for maintaining a record of one or more pre-defined fraud indicators. The fraud indicator configuration database is coupled to a historical database that is provided to maintain a record of one or more historical fraud indicators. The fraud monitoring unit dynamically analyzes message communications with reference to the pre-defined fraud indicators and the historical fraud indicators as these message communications are routed through the Message Service Center and the mobile switching center.

The fraud monitoring unit is coupled to a fraud mitigation unit. The fraud mitigation unit is provided to mitigate instances of fraudulent messaging activity occurring within the messaging system network. Upon a determination that fraudulent messaging activity is occurring, the fraud mitigation unit activates at least one of the following: a message termination unit that is provided to terminate in-process fraudulent communications messages; a destination blocking unit that is provided to record and block future message communications to destinations that have been associated with fraudulent activities; and a credential reset unit that is provided to trigger the provisioning server to reset the credentials of a user account associated with the fraudulent messaging activity.

In a further aspect, the present embodiment provides a system and method for VoIP fraud mitigation for a hosted VoIP PBX system wherein a call or message blocking service is provided. Once a fraud alert is received from the fraud detection service, the identified targeted calling locations or messaging destinations originating from the identified devices and accounts where fraud is occurring or recently occurred can be blocked. The location or destination information can be granular, such as a specific phone number; or more general, such as a calling area code, country code or continent. The call or message blocking service, having received a fraud alert from the fraud detection service, can implement the call or message blocking in a variety of ways, including communicating with the VoIP PBX or mobile switching center through an API to register the call or message blocking rules for the device or a group of devices for the blocked calling locations or messaging destinations.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
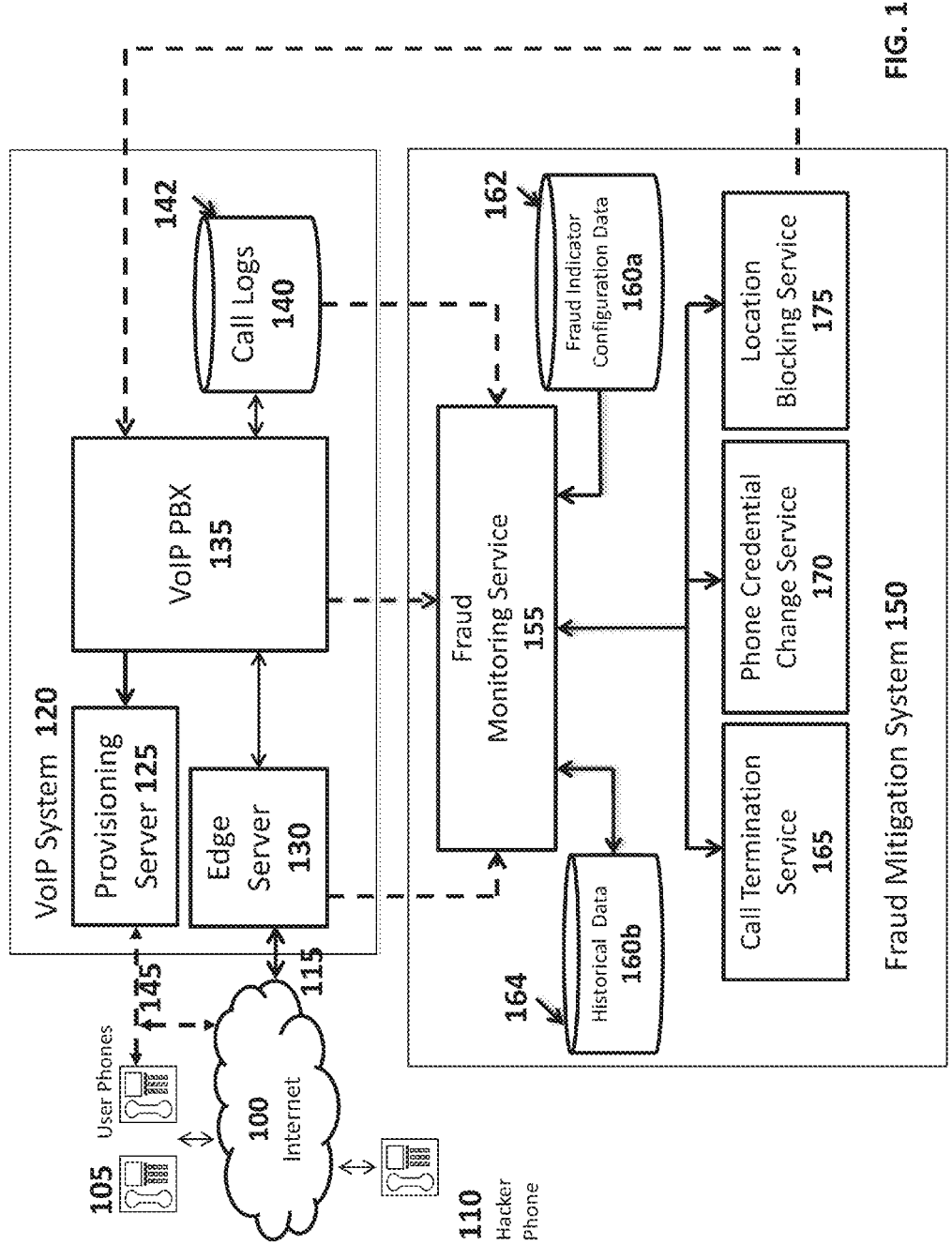
FIG. 1 is a block diagram of an exemplary embodiment of a hosted VoIP PBX Fraud Mitigation System in accordance with the subject invention.

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 7 below.

Embodiments of the methods and systems are described below with reference to block and flowchart diagrams of methods, systems, apparatuses and computer program products. It will be understood that each block of the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks contained in the block diagrams and flowchart diagrams support combinations of means for performing the specified functions, combinations of steps for performing the specified functions and program instruction means for performing the specified functions. It will also be understood that each block of the block diagrams and flowchart diagrams, and combinations of blocks in the block diagrams and flowchart diagrams, can be implemented by special purpose hardware-based computer systems that perform the specified functions or steps, or combinations of special purpose hardware and computer instructions.

VoIP Fraud Mitigation

FIG. 1 is a block diagram that details the various aspects of an exemplary embodiment in which the methods and systems of the subject invention can operate. The present disclosure relates to methods and systems for providing a hosted VoIP PBX Fraud Mitigation System that monitors a VoIP PBX, the Session Initiation Protocol (SIP) Devices (which are client devices, such as Internet-based telephone terminals) that register directly and interact with the VoIP PBX, and the network connections between the VoIP PBX and a plurality of SIP Devices. In addition, the systems and methods described herein are also applicable to text and media messaging systems, such as Short Message Service (SMS) or Multimedia Messaging Service (MMS) messages (both hereinafter referred to as "messaging services"), available via applications executing on a SIP Device, mobile device or other computing devices. Discussions related to the fraud mitigation service for text and media messaging systems are included below. Furthermore, the Fraud Mitigation System 150 is either non-disruptive or minimally disruptive to users and account holders of the VoIP PBX and messaging systems during fraud mitigation operations. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

Turning now to FIG. 1, a block diagram illustrating a system 150 for providing fraud mitigation for a VoIP System 120 is provided. The Fraud Mitigation System 150 works with a VoIP System 120 used by one or more organizations for intra-company telecommunications and for telecommunications to and from outside parties via the Internet 100 or the PSTN (not shown). The Fraud Mitigation System 150 comprises a Fraud Monitoring Service 155, a Call Termination Service 165, a Phone Credential Change Service 170 and a Location Blocking Service 175. The Fraud Monitoring Service 155 detects potential fraud based on multiple fraud indicators as defined in the Configuration Data 160a. The Configuration Data 160a can be customized for individual users or groups, which in turn can trigger the other parts of the system to mitigate fraud. The Call Termination Service 165 terminates in-process calls that are identified as potentially fraudulent. The Phone Credential Change Service 170 resets the security authorization credentials for the authorized user (subscriber) accounts and/or SIP device(s) (hereinafter "user accounts and/or devices" 105) which credentials have been potentially compromised by the fraud perpetrator. The Location Blocking Service 175 blocks future calls from fraud perpetrators, such as Hackers 110, based on previously identified fraudulent calling data.

The embodiments described herein provide protection against fraud damage and are unique beyond prior methods in that, beyond other aspects, in-process calls that are potentially fraudulent are terminated immediately combined with device credential reset and call location blocking to stop further fraudulent calls. This Fraud Mitigation System 150 and an attendant method (described in greater detail below) allow for minimal disruption of the calls of authorized users and is unique beyond prior methods in that it combines configurable thresholds for detection of fraud with targeted mitigation techniques, including the automated reset of credentials for authorized user accounts and/or devices 105 and the automated blocking of calls from non-authorized devices 110 and to specific non-authorized locations.

The Fraud Monitoring Service 155 relies on Configuration Data 160a stored in a First Connected Storage Component 162, wherein the Configuration Data 160a is used to define fraud threshold triggers or fraud indicators. The Fraud Mitigation System 150 uses this Configuration Data 160a to dynamically monitor calls that are being placed within the network in real time, by one or a group of user accounts and/or devices 105 for activities that are indicative of fraud.

Fraud indicators selected for the Configuration Data 160a can be based on any number of factors. Some of these factors include, but are not limited to, destination of the outgoing calls, calling patterns, time of day calls are placed, and the like. Fraud indicators related to real-time calling pattern data are used to analyze one or more characteristics of the calls being placed by one or a group of user accounts and/or devices 105. Real-time calling pattern data can also include the accumulated number of calls placed, the accumulated number of calls placed within a specific time period, the types of calls placed (such as international or toll-free calls), or the estimated or exact cost of calls being placed and other real-time calling pattern data. Fraud indicators can rely on thresholds that are defined for specific time periods, such as the number of calls made by one or a group of user accounts and/or devices 105 in a minute or in an hour of a given day; or the accumulated cost of calls within a specific time period, such as per minute, per hour, per day, etc. Each of these characteristics may be used individually or cumulatively in the real-time analysis of outgoing calls. The Configuration Data 160a can be provided individually for each user account and/or device 105 or universally across a service provider's network.

The Fraud Monitoring Service 155 can be further configured to intervene based upon Historical Data 160b from a Second Connected Storage Component 164. In an exemplary embodiment, once the Fraud Mitigation System 150 determines that a particular call is fraudulent, meta-data and other characteristics of the call can be analyzed and stored in the Historical Data 160b. As calls are being placed in real-time, the Fraud Monitoring Server 155 can first query the Historical Data 160b to determine if the call matches any previously determined fraudulent patterns. For example, the Fraud Monitoring Service 155 can be further configured to record certain phone numbers or calling destinations that were previously determined to be fraudulent. Future calls to these phone numbers or calling destinations can be blocked. The Fraud Monitoring Service 155 can also block certain types of calls during certain hours of the day if there is a history of fraudulent calls being placed during certain hours of the day. For example, if historically most fraudulent calling activity occurs between 1:00 am and 6:00 am on a given day of the week, the Fraud Monitoring Service 155, can be configured to block all toll calls for a given phone number or subscriber during those hours.

The Fraud Monitoring Service 155 can be configured to record or memorialize any previous calling activity that was determined to be fraudulent in the Historical Data 160b. For example, in an exemplary embodiment, the Historical Data 160b can include location-based calling pattern data, including calls to specific phone numbers, area codes, states, or countries around the world. In the exemplary embodiment, if a country has a known history or pattern of originating or receiving fraudulent calling activity, this information can be stored in the Historical Data 160b so that calls to that country may be placed under stricter scrutiny. Therefore, any number of factors can be recorded in the Historical Data 160b and any number of these recorded factors can be used by the Fraud Monitoring Service 155 to analyze calling patterns initiated by one or a group of user accounts and/or devices 105 to interrupt fraudulent calling activities.

The Fraud Monitoring Service 155 can dynamically adjust fraud indicators based on user settings and/or Historical Data 160b. For example, a calling threshold can be set stricter during particular periods of time, such as off-peak hours. This also allows the Fraud Monitoring Service 155 to dynamically adjust fraud indicators based on Historical Data 160b, including previously observed patterns and statistical data. Furthermore, different fraud indicators can be defined for different users or groups. The different fraud indicators can be based on the previous Historical Data 160b of the group or the previous Historical Data 160b of the service provider.

The Fraud Monitoring Service 155 can combine one or more fraud indicators available in the Fraud Indicator Configuration Data 160a and the Historical Data 160b in its analysis of outgoing calls. For example, the Fraud Monitoring Service 155 may consider multiple calls within a short time period to certain high-fraud risk countries, after business hours, to be indicative of fraudulent calling activity. Any number of factors could be combined in any number of ways to trigger the Fraud Monitoring Service 155 to detect potential fraud associated with a user account and/or device 105. The Fraud Monitoring Service 155 can also be configured such that if multiple thresholds are exceeded for one or more fraud indicators, then the outgoing call is interrupted.

The Fraud Monitoring Service 155 dynamically monitors the call activity of one or a group of user accounts and/or devices 105 on a VoIP PBX network 135 and then compares the activity to the configured fraud indicators. The Fraud Monitoring Service 155 can monitor activity on a VoIP PBX 135 in a variety of ways, including but not limited to: monitoring network traffic through an Edge Server 130 through which user accounts and/or devices 105 and VoIP communications pass to or from the VoIP PBX 135; monitoring activity through direct communications with the VoIP PBX 135, such as through an API of the VoIP PBX 135; reading Call Logs 140 produced by the VoIP PBX 135 for completed calls, such as those stored in a database or similar storage device 142 with an interface allowing such Call Logs 140 to be accessed and read. When the activity of one or a group of user accounts and/or devices 105 on a VoIP PBX network 135 meets or exceeds the fraud thresholds or fraud indicators defined for the network or subscriber, then the Fraud Monitoring Service 155 triggers a fraud alert to the other system components 165, 170, and 175 such that mitigation actions are taken. The fraud alert identifies to the other system components 165, 170 and 175 an individual user, a group of users and/or one or more SIP devices 105 on the VoIP PBX network 135 for which the presumed fraud was detected, as well as the calling locations where the presumed fraudulent calls were placed. This activity may be recorded as Historical Data 160*b* to prevent similar fraudulent activity from occurring in future calls. Historical Data 160*b* can store fraudulent calling patterns, such as a high volume of fraudulent calls to a specific location within a specific time period. This can trigger the Fraud Monitoring Service 155 to take immediate action for the affected user account and/or device 105. Similarly, repeated occurrences, recorded in the Historical Data 160*b* across multiple user accounts and/or devices 105 can result in the Fraud Monitoring Service 155 recognizing a repeated problem to that location, which in turn, can result in using the Location Blocking Service 175 to block all calls to that location across all user accounts and/or devices 105. In an alternative embodiment, the Location Blocking Service 175 can also limit its location blocking via more fine-grained methods, such as blocking all calls during specific time periods, for example on weekends and/or between the hours of 1 am and 6 am; blocking all calls to a specific location during defined time periods (e.g. after normal work hours, nights, weekends); and/or blocking certain types of calls, such as long distance calls, during specific time periods that have historically had a strong propensity to indicate fraudulent activity.

In a further embodiment, the Fraud Mitigation System 150 includes a Call Termination Service 165. Having received a fraud alert message from the Fraud Monitoring Service 155, the Call Termination Service 165 relies on information in the fraud alert message to identify the devices and calling locations where fraud is presumed to be occurring or has recently occurred. The Call Termination Service 165 can immediately terminate all in-process calls originating from user accounts and/or devices 105 where the presumed fraud was detected and going to destinations where presumed fraudulent calls or potentially fraudulent calls are directed. In an alternative embodiment, the Call Termination Service 165 can only terminate those calls that are presumed to be fraudulent, while allowing other calls originating from the affected user accounts and/or devices 105 to remain active. The Call Termination Service 165 can base its call termination decisions according to Historical Data 160*b* from the Fraud Indicator Configuration Data 160*a* and analysis by the Fraud Monitoring Service 155. Therefore, if an affected user account and/or device 105 has an authorized, active, outgoing call that is in process, and a Hacker 110 is able to infiltrate the same user account and/or device 105 to engage in fraudulent activity during the same time, the Fraud Monitoring Service 155 is capable of distinguishing the authorized calling activity over the potentially fraudulent calling activity that is originating from the user account and/or device 105. The Fraud Monitoring Service 155 can engage the Call Termination Service 165 to terminate the fraudulent activity originating from the affected user account and/or device 105 while allowing the authorized call originating from the user account and/or device 105 to continue to remain active. The Fraud Monitoring Service 155 can analyze activity originating from a user account and/or device 105 in connection with the Historical Data 160*b*, for example previous calls to a regularly dialed phone number, to determine whether an outgoing communication is authorized or fraudulent. The authorized call would remain active, while other calls, deemed to be fraudulent, would be terminated.

The Call Termination Service 165 can force the end of calls in a variety of ways. For example, the Call Termination Service 165 can force the end of calls through an API made available by the VoIP PBX 135 with call control capabilities. The Call Termination Service 165 can also force the end of calls through interaction and manipulation of an Edge Server 130. If necessary the Call Termination Service 165 can terminate the call at the affected user account and/or device 105, by sending an API for a call termination or "hang-up" request to the affected user account and/or device 105.

In a further embodiment, there is a Phone Credential Change Service 170. The Fraud Monitoring Service 155 identifies the user accounts and/or devices 105 from which a presumed Hacker 110 has obtained credentials to either place fraudulent calls through the user accounts and/or devices 105 or through separate devices 110 using those credentials, which triggers a fraud alert message in the Fraud Mitigation System 150. Once the Phone Credential Change Service 170 receives a fraud alert message from the Fraud Monitoring Service 155, the Phone Credential Change Service 170 immediately instructs a Provisioning Server 125 to issue new credentials to the VoIP PBX 135 for the compromised user accounts and/or devices 105. The Provisioning Server 125 delivers these new credentials to the authorized user accounts and/or devices 105 through a secure channel 145. The Provisioning Server 125 can also issue other configuration changes to the targeted user account and/or device 105 in order to protect against further fraud. In an embodiment, the user account and/or device 105 receives a special API call or other signal from the Provisioning Server 125 with the new credentials over the secure channel 145. In an exemplary embodiment, the user account and/or device 105 is capable of "hot-swapping" the old login credentials for the new login credentials. This means authorized users of the user accounts and/or devices 105 can continue to use their devices with potentially no down time. However, in an alternative embodiment, some user accounts and/or devices 105 may require a reboot. In these instances, for the affected user accounts and/or devices 105, the user can continue to communicate on an existing call; however, once the existing call is completed, the user will be required to reboot or reinitiate the user account and/or device 105 before another call can be placed from the device. In other embodiments, a signal sent from the Provisioning Server 125 can automatically reboot or reinitiate a user account and/or device 105 either once the signal is received at the user account and/or device 105 or once an authorized user of the account and/or device 105 completes an existing call. In still an alternative embodiment, for a user account and/or device 105 requiring a reboot, any active users of the user account and/or device 105 may receive a tone or message during the active call indicating that the call will be terminated within a specific amount of time and at the expiration of that time, the Phone Credential Change Service 170 would automatically reboot the device with the new network access credentials.

In a further embodiment, the Provisioning Server 125 issues login and other network access credentials to the user accounts and/or devices 105. In an embodiment, the Provisioning Server 125 can dynamically assign, revoke, and/or change access credentials of the user accounts and/or devices 105 connected to the VoIP PBX network 135. In one configuration, a user account and/or device 105 can contain instructions to periodically "ping" the Provisioning Server 125 to verify that the user account and/or device 105 credentials are still current and active. Once a user account and/or device 105 is deemed to have been compromised, then the Provisioning Server 125 can dynamically and automatically reassign network access credentials of the user account and/or device 105 without user or operator intervention. These new or reassigned network access credentials can result in the termination of all active calls for the user account and/or device 105. However, in an alternative embodiment, the Call Termination Service 165 can instruct the Provisioning Server 125 to delay reassignment of the network access credentials until after an authorized call from the user account and/or device 105 is terminated. However, the Call Termination Service 165 can still identify a potentially fraudulent call originating from the user account and/or device 105 and terminate it while it is in process without affecting the authorized call.

In a further embodiment, the Provisioning Server 125 can issue network access credentials to the user accounts and/or devices 105 via a Push, Pull and Push-Pull protocol. Push, Pull and Push-Pull protocols are methods of automated device communications within the VoIP system 120. These methods can be specific to the user account and/or device's 105 operating system or the network system. A push occurs when a network component pushes (i.e. sends) credentials, instructions, or other data out to a user account and/or device 105. A pull occurs when a user account and/or device 105 requests credentials, instructions, or other data from a network component or user account and/or device 105. Consequently, a Push-Pull operation occurs when both of the actions occur synchronously. In an embodiment, the Provisioning Server 125 generates network access credentials (e.g. login identifier and password) for a user account and/or device 105. These access credentials allow the user account and/or device 105 to communicate with the VoIP system 120 that is provided by the user account and/or device's 105 service provider. These access credentials may be different from the user account and/or device 105 credentials used to access other services via their VoIP, messaging, or telephony service provider. The Push, Pull and Push-Pull protocols are discussed in greater detail in the discussion of FIGS. 4-6 below.

In a further embodiment, the Phone Credential Change Service 170 communicates through the Provisioning Server 125 with the user accounts and/or devices 105 over a secure connection 145 that can be separate from the connection 115 between the user accounts and/or devices 105 and Edge Server 130. The Provisioning Server 125 manages the connections between the user accounts and/or devices 105 with the VoIP System 120 by assigning and revoking configuration credentials that the user accounts and/or devices 105 need in order to connect to the VoIP System 120. The Provisioning Server 125 can assign the user accounts and/or devices 105 pertinent configuration information such as the user name, password, domain name system (DNS) location, Internet protocol (IP) addresses, etc. The new credentials can include a new username and password for the user accounts and/or devices 105. Furthermore, the Provisioning Server 125 can configure the user accounts and/or devices 105 with additional configuration settings including an alternative connection point such as a new IP address or DNS location. By issuing new credentials and other secure configuration instructions automatically, the Phone Credential Change Service 170, in communication with the Provisioning Server 125, allows an authorized user accessing the authorized device to continue making phone calls, while a Hacker 110 who has obtained the prior credentials and used them to place fraudulent phone calls through the VoIP PBX 135 is denied further access. Preferably, the action to deny the Hacker 110 continued access occurs immediately upon detection of the fraudulent activity. The new credentials and related data can be securely delivered to the user accounts and/or devices 105 in a variety of ways, including but not limited to: staging them on a secure server to which only authorized user accounts and/or devices 105 can connect and which the devices poll frequently for updates; sending them directly over the network to the user accounts and/or devices 105 where the device IP addresses are known and accessible to the Phone Credential Change Service 170 and where an interface for the delivery of such information exists on the device. The Provisioning Server 125 provides a file store for user accounts and/or devices 105 configuration files since there are different formats for different types of phones according to the device manufacturer requirements. Each account and/or device 105 has a DNS address for the Provisioning Server 125 and these user accounts and/or devices 105 pick up files at a configured interval via a known network connection protocol such as FTP or HTTP. The Provisioning Server 125 may also contain code to periodically "ping" the user accounts and/or devices 105 via the secure connection 145 so that their login credentials can be automatically changed frequently and immediately. In an alternative embodiment, the Provisioning Server 125 can periodically send a signal to user accounts and/or devices 105 that can trigger a credential change that requires a reboot (typically after business hours). These frequent and periodic credential changes can make it very difficult to hack the VoIP System 120.

In still a further embodiment, there is a Location Blocking Service 175. Having received a fraud alert message from the Fraud Monitoring Service 155, which identifies the user accounts and/or devices 105 and calling locations where fraud is presumed to have recently occurred and where fraud may still be occurring, the Location Blocking Service 175 can immediately take action to block further calls from the potentially compromised user accounts and/or devices 105 to the targeted locations. Locations might be granular, such as a specific phone number, or more general, such as a calling area code, country code, or even a continent. The Location Blocking Service 175 could be used to block all calling to a location across all user accounts and/or devices 105. For example, if a number of user accounts and/or devices 105 are compromised and the Fraud Monitoring Service 155 detects multiple user accounts and/or devices 105 all calling the same target location, then the action taken can be to completely block all calls to that location regardless of the user accounts and/or devices 105 being used. The Location Blocking Service 175 can implement call blocking in a variety of ways, such as by communicating with the VoIP PBX 135 through an API to register the call blocking rules for the user accounts and/or devices 105 or a group of user accounts and/or devices 105 and for the blocked calling locations. The Location Blocking Service 175 can store the blocked calling location and call blocking rules within the Historical Data 160b for future reference by the Fraud Mitigation System 150.

Figure 2:
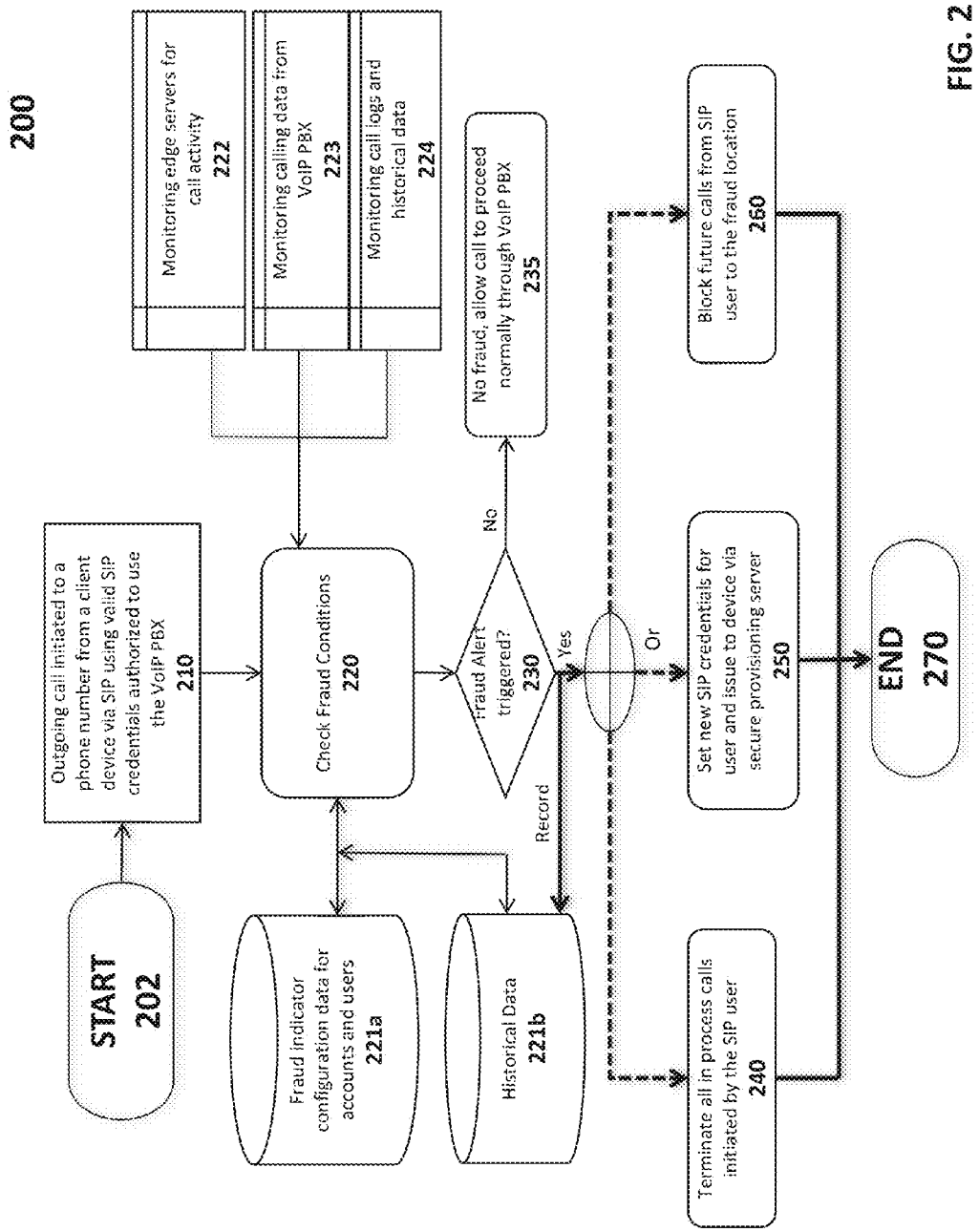
FIG. 2 is a flowchart of an exemplary embodiment of a method of hosted VoIP PBX fraud mitigation in accordance with the subject invention.

Turning now to FIG. 2, a flowchart diagram of a method 200 for implementing VoIP fraud mitigation is provided. The method is described in association with the Fraud Mitigation System 150 described above. Beginning at step 202 and proceeding to step 210, an outgoing call is initiated to a phone number from a user account and/or device 105 via SIP using valid SIP credentials authorized for use on the VoIP PBX 135. The method then proceeds to step 220.

The Fraud Monitoring Service 155 monitors the user accounts and/or devices 105 for activities that match previously identified fraudulent activity, exceed fraud threshold conditions, or match fraud indicators at step 220. More specifically, the Fraud Monitoring Service 155 can monitor the Edge Server 130 for call activity at step 222. The Fraud Monitoring Service 155 can also monitor the VoIP PBX 135 for calling data at step 223 which can indicate fraudulent activity. The Call Logs 140 and Historical Data 160b are further monitored at step 224 to determine patterns of calling activity, which can indicate various types of fraud. The monitored data gathered in steps 222-224 is collected and compared at step 220 to Fraud Indicator Configurable Data and/or to Historical Data gathered in steps 221*a*, 221*b* respectively. The system is able to evaluate fraud conditions 220 by determining if the data collected in steps 222-224 match the Historical Data 160*b* and/or exceeds the conditions established in the Fraud Indicator Configuration Data 160*a*. These Fraud Indicator Configuration Data 160*a* can comprise call volume, call length, call type, and/or calling expenditures per user account and/or device 105, etc. Historical data 160*b* including typical calling patterns, location of originating call, calling locations, frequency of calls, frequency of calls at various times during the day, frequency of calls to various locations, frequency of call during various days of the week, average length of calls, frequency of calls to numbers or locations not within the user's contact database, and other fraudulent calling pattern data can also be monitored. This data can be configured for individual user accounts and/or devices 105, organizations, groups of accounts and/or devices 105, and/or network-wide for a given service provider. Therefore, different user accounts and/or devices 105 within the same group or organization may have different Fraud Indicator Configurable Data 160*a* or conditions. Thus, each user account and/or device 105 may have Fraud Indicator Configuration Data 160*a* that may be configured individually or as part of a group. Alternatively, the service provider may provide universal Fraud Indicator Configuration Data 160*a* and Historical Data 160*b* to prevent fraudulent activity. After this comparison of Fraud Indicator Configuration Data 160*a* versus Historical Data 160*b* is made, the method proceeds to step 230.

At step 230 the Fraud Monitoring Service 155 determines if the monitored data gathered in steps 222-224 has exceeded the Fraud Indicator Configuration Data 160*a* and/or matches some Historical Data 221*b* at step 220. If the thresholds have been exceeded, the service records this information in the Historical Data 160*b*. If the thresholds have been exceeded or if calling activity matches the Historical Data 160*b*, then the Fraud Mitigation System 150 activates at least one of steps 240, 250, or 260. If the thresholds have not been exceeded, the system proceeds to step 235, where the call is allowed to proceed normally since no fraudulent activity has been detected.

The Fraud Monitoring Service 155 can send out a fraud alert to the Call Termination Service 165, the Phone Credential Change Service 170, or the Location Blocking Service 175. The fraud alert contains information for identifying the user account and/or device 105 that is suspected of fraudulent activity. At step 240, the fraud alert is passed to the Call Termination Service 165. The Call Termination Service 165 acts immediately to terminate all in process calls initiated by the affected user accounts and/or devices 105. The Call Termination Service 165 can issue instructions to the Edge Server 130, the VoIP PBX 135 or to the user accounts and/or devices 105 to terminate in process calls from the affected user accounts and/or devices 105.

At step 250, the fraud alert is passed to the Phone Credential Change Service 170. The Phone Credential Change Service 170 contacts the Provisioning Server 125 and orders it to reset the credentials of the affected user accounts and/or devices 105 that are registered with the VoIP PBX 135. The Phone Credential Change Service 170 instructs the Provisioning Server 125 to immediately issue new credential requirements to the VoIP PBX 135 for the potentially compromised user accounts and/or devices 105. The credential changes are handled through a secure channel 145 or connection 115 between the user accounts and/or devices 105, the Provisioning Server 125, the VoIP PBX 135, and the Phone Credential Change Service 170. Other configuration data associated with the affected user accounts and/or devices 105 can also be changed. The new credentials can include a new SIP username and password. The other configuration data can include other network identifiers such as a new IP address or DNS location, for example.

At step 260, the fraud alert is sent to the Location Blocking Service 175. The Location Blocking Service 175 receives the fraud alert and analyzes the calling data to determine the calling locations of the fraudulent activity. This calling location information can be granular, such as a specific phone number. This calling location information can also be more general, such as a calling area code, country code, or a continent. The Location Blocking Service 175 immediately takes action to block further calls from user accounts and/or devices 105 connected to the VoIP PBX 135 system. The Location Blocking Service 175 can record this information in Historical Data 160*b* such that the VoIP PBX 135 can block all future fraudulent activity associated with a particular calling location. The method 200 ends at step 270.

Note, in an alternate embodiment of the invention, the activities occurring in steps 240-260 may occur sequentially, simultaneously or in any combination thereof including not taking one or more such steps. This allows the components of the Fraud Mitigation System 150 to work together to immediately stop fraudulent activity while allowing authorized owners of the user accounts and/or devices 105 to continue to use their devices with minimal interruption.

Figure 3:
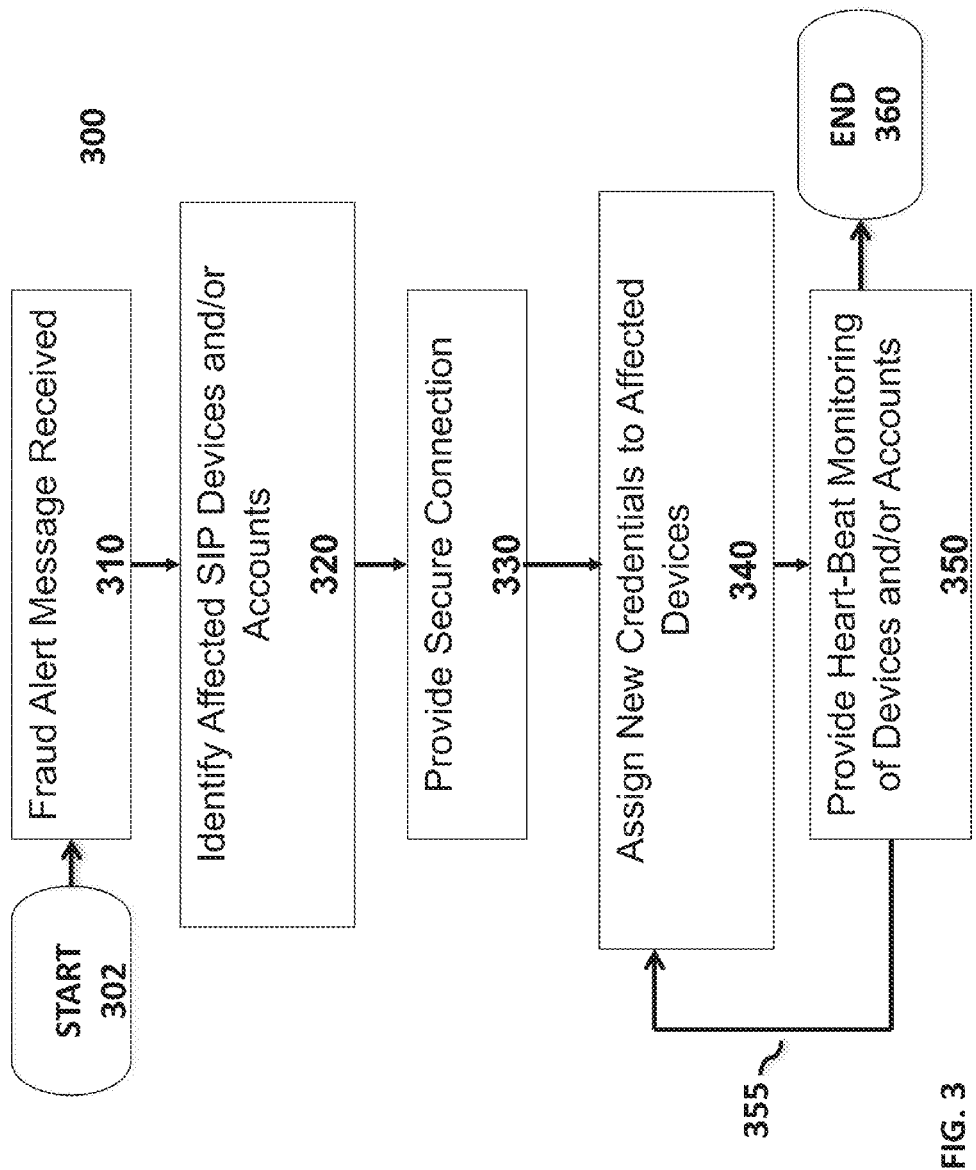
FIG. 3 is a flowchart of an exemplary embodiment of a method for performing credential reset in accordance with the subject invention.

Turning now to FIG. 3, a method 300 of acting upon phone credentials based upon a fraud mitigation alert is provided. The method is described in association with the Fraud Mitigation System 150 described above. Beginning at step 302 and proceeding to step 310 the Phone Credential Change Service 170 receives a fraud alert message from the Fraud Monitoring Service 155. The fraud alert message contains information for identifying the affected user accounts and/or devices 105. The Phone Credential Change Service 170 then acts on this information to stop the fraudulent activity.

At step 320, the Phone Credential Change Service 170 parses the fraud alert message to identify the affected user accounts and/or devices 105. The identified user accounts and/or devices 105 can include an individual device or a group of devices.

At step 330, the Phone Credential Change Service 170 provides a secure connection with the affected user accounts and/or devices 105 so that their individual credentials can be reset. The Phone Credential Change Service 170 also establishes a secure connection with the VoIP PBX 135 so that it can be updated with the new credentials of the affected user accounts and/or devices 105.

At step 340 the Phone Credential Change Service 170 then resets the credentials and automatically assigns new user names and passwords for the affected user accounts and/or devices 105. In addition, the Phone Credential Change Service 170 can also assign a new IP address and/or DNS locations for the affected user accounts and/or devices 105. The Phone Credential Change Service 170 further updates the VoIP PBX 135 with this new credential information for the affected user accounts and/or devices 105 using the secure connection.

At step 350 the Phone Credential Change Service 170 provides Heart-Beat Monitoring to the user accounts and/or devices 105 by periodically verifying that the user accounts and/or devices 105 are securely connected to the network and have not been tampered with. Therefore, the Phone Credential Change Service 170 monitors the user accounts and/or devices 105 for other suspicious activity, including but not limited to, an IP address change or a DNS location change, for example. This monitoring can take place continuously by allowing the Provisioning Server 125 to periodically "ping" the user accounts and/or devices 105 to ensure they are securely connected to the network. In a further embodiment, the Provisioning Server 125 periodically updates the credentials of the user accounts and/or devices 105 by assigning new credentials to these devices. Furthermore, individual user accounts and/or devices or a group of user accounts and/or devices 105 that have been consistently targeted by Hackers 110, may receive special attention from the Provisioning Server 125, such that their credentials are more frequently updated either permanently or at least for some period of time via a feedback loop at step 355. The method 300 ends at step 360.

Messaging Fraud Mitigation

Figure 4:
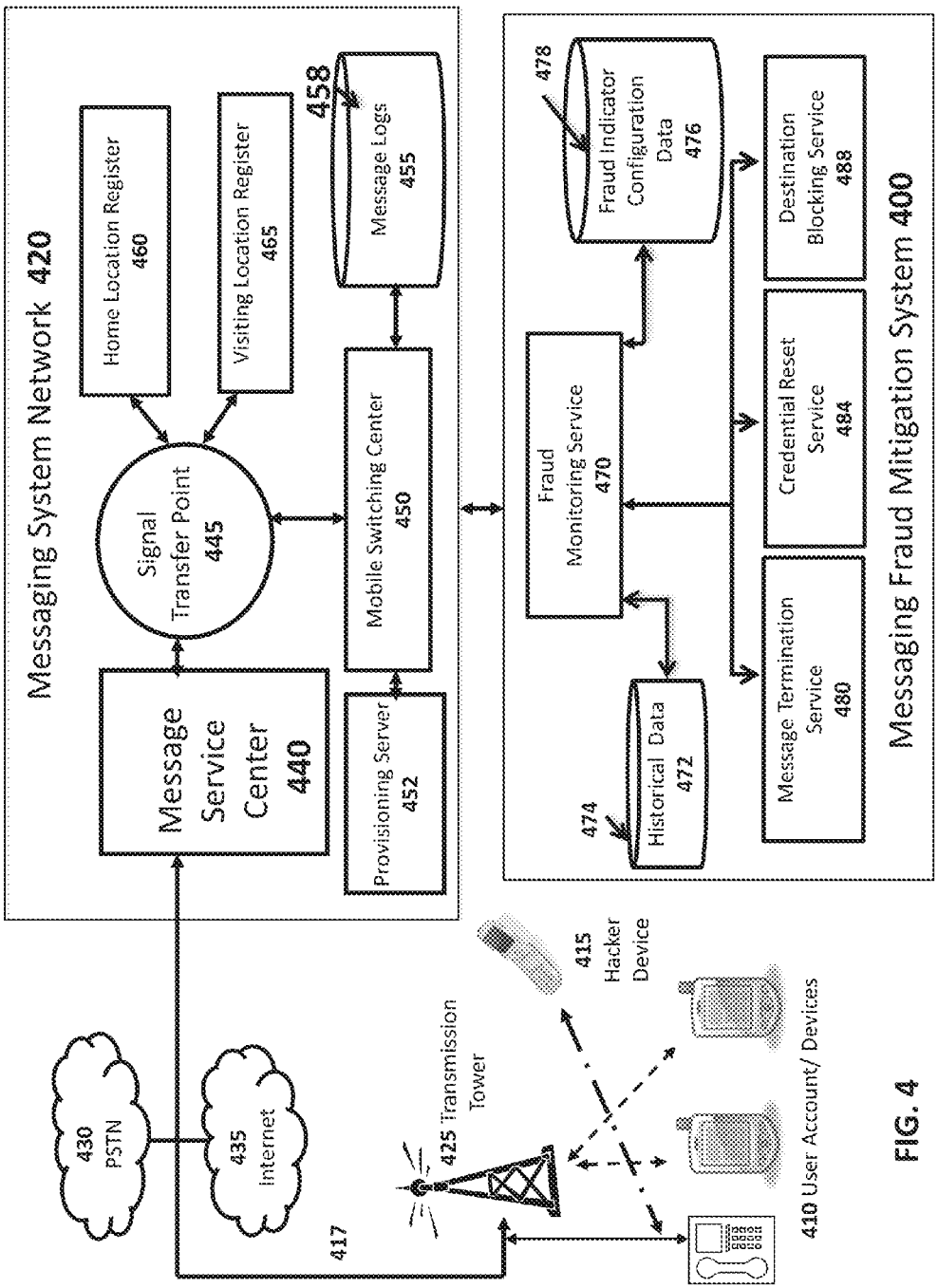
FIG. 4 is a block diagram of an exemplary embodiment of a Messaging Fraud Mitigation System in accordance with the subject invention.

Turning now to FIG. 4, a block diagram illustrating a system 400 for providing messaging fraud mitigation for a Short Message Service (SMS) or Multimedia Messaging Service (MMS) messaging system 420 is provided. Like VoIP, hosted messaging services are subject to fraud such as Message Spoofing and Message Faking, discussed above in the Background section, wherein a hacker gains access to an authorized user's access credentials and sends messages using the user's account information. In an embodiment, a hacker gains access to the authorized user's credentials when Messaging System Networks 420 expose portions of their Hypertext Transfer Protocol (HTTP) or Secure-Hypertext Transfer Protocol (HTTPS) messaging APIs when establishing connections with user accounts and/or devices 410 over wireless networks using transmission towers 425, wireless fidelity (Wi-Fi) networks and the like. Therefore, messaging is subject to similar fraud concerns as VoIP calling, notably in a hosted Internet-based system because Internet-based systems tend to be prime targets for hackers due to the ability to access these systems from remote, undetectable, locations. For example, if a hacker obtains the credentials used to authenticate to the Internet-based system, the hacker thereby gains the access to "impersonate" an authenticated user or device to send SMS messages. A hacker might deliver SMS messages using the hijacked account. The service provider would pay the costs of SMS termination for the messages, and a hacker with malicious intent could thereby run up large costs in a small amount of time if not discovered and stopped immediately. A hacker might obtain the credentials to the Internet-based system through a variety of means, including but not limited to social hacking (obtain from an unsuspecting legitimate user), phishing, device hacking (breaking into a legitimate user device), or man-in-the-middle attacks on unsecured networks.

The Messaging Fraud Mitigation System 400 may work within a VoIP System 120 used by one or more organizations for intra-company telecommunications and for telecommunications to and from outside parties via the Internet 435 or the PSTN 430. The Messaging Fraud Mitigation System 400 can include a Fraud Monitoring Service 470, a Message Termination Service 480, a Credential Reset Service 484 and a Destination Blocking Service 488. The Fraud Monitoring Service 470 detects potential fraud based on multiple fraud indicators and Fraud Indicator Configuration Data 476 that can be customized for individual users or groups and, which in turn, can trigger the other parts of the Messaging Fraud Mitigation System 400 to mitigate fraud. The Message Termination Service 480 terminates in-process messages that are identified as potentially fraudulent. The Credential Reset Service 484 resets the security authorization credentials for the authorized user (subscriber) accounts and/or device(s) (hereinafter "user accounts and/or devices" 410) whose credentials have been potentially compromised by the fraud perpetrator. The Destination Blocking Service 488 blocks future messages from fraud perpetrators, such as from a Hacker Device 415, based on previously identified fraudulent messaging data.

The embodiments described herein provide protection against fraudulent messaging by allowing in-process messages that are potentially fraudulent to be terminated immediately. The embodiment further provides for resetting the messaging access credentials of an authorized device that is the "source" of the fraudulent messages and blocking the destination addresses that are designated to receive the fraudulent messages. In an embodiment, the user accounts and/or devices 410 are dual authenticated by both an account identifier and account password that allows access to the user accounts and/or devices 410 within the VoIP or messaging servicer provider's network. The user accounts and/or devices 410 are further authenticated to the Messaging System Network 420 using a messaging access identifier and password to allow messages to be sent to and from the user accounts and/or devices 410 over the Messaging System Network 420. This Messaging Fraud Mitigation System 400 and an attendant method (described in greater detail below) minimizes disruption by combining configurable thresholds for detection of fraud with targeted mitigation techniques. These targeted mitigation techniques can include an automated reset of credentials for authorized user accounts and/or devices 410, so that messages from non-authorized hacker devices 415 are blocked, as well as the blocking of specific non-authorized messaging addresses or locations (e.g. message destination phone numbers targeted by hackers).

The Fraud Monitoring Service 470 relies on Fraud Indicator Configuration Data 476 stored in a Connected Storage Component 478, wherein the Fraud Indicator Configuration Data 476 is used to define fraud threshold triggers or fraud indicators. The Messaging Fraud Mitigation System 400 uses this Fraud Indicator Configuration Data 476 to dynamically monitor messages that are being generated in real-time by one or a group of user accounts and/or devices 410 for activities that are indicative of fraud.

Fraud indicators selected for the Fraud Indicator Configuration Data 476 can be based on any number of factors. Some of these factors include, but are not limited to, destination of the outgoing messages; volume of messages within a specific time frame; accumulated cost of messages within a specific time frame; frequency of the outgoing messages; messaging patterns; temporal characteristics of a message; diversity of recipient locations; known common destinations for fraudulent activity and the like. Fraud indicators related to real-time messaging pattern data are used to analyze one or more characteristics of the messages being placed by one or a group of user accounts and/or devices 410. Real-time message pattern data can also include the accumulated number of messages placed, the accumulated number of messages placed within a specific time period, the types of messages placed (such as SMS or MMS), or the estimated or accumulated cost of messages being placed and other real-time messaging pattern data. Fraud indicators can further rely on thresholds that are defined for specific time periods, such as the number of messages made by one or a group of user accounts and/or devices 410 in a minute or in an hour of a given day; or the accumulated cost of calls within a specific time period, such as per minute, per hour, per day, etc. Each of these characteristics may be used individually or cumulatively in the real-time analysis of outgoing messages. The Fraud Indicator Configuration Data 476 can be provided individually for each user account and/or device 410 or universally across a service provider's network.

The Fraud Monitoring Service 470 can be further configured to intervene based upon Historical Data 472 from a Connected Storage Component 474. In an exemplary embodiment, once the Messaging Fraud Mitigation System 400 determines that a particular message is fraudulent, metadata and other characteristics of the message can be analyzed and stored in the Historical Data 472. In a further embodiment, the Historical Data 472 can store information related to a User Device 410 contact list or messaging history such that addresses and contacts that are not found within the User Device's 410 contact list or messaging history can receive greater scrutiny. For example, if outbound messages are being initiated to addresses not found in the User Device's 410 contact list or history during a certain time period (e.g. after business hours), the messages may be blocked from being transmitted. As messages are being sent in real-time, the Fraud Monitoring Service 470 can first query the Historical Data 472 to determine if the message matches any previously determined fraudulent patterns. For example, the Fraud Monitoring Service 470 can be further configured to record certain phone numbers, addresses or messaging destinations associated with messages that were previously determined to be fraudulent. Future messaging attempts to these phone numbers, addresses or calling destinations can be blocked. The Fraud Monitoring Service 470 can also block certain types of messages during certain hours of the day if there is a history of fraudulent messages being sent during certain hours of the day. For example, if historically, most fraudulent messaging activity occurs between 1:00 am and 6:00 am on a given day of the week, the Fraud Monitoring Service 470 can be configured to block all messages for a given phone number, address, messaging destination or subscriber during those hours.

The Fraud Monitoring Service 470 can be configured to record or memorialize any previous messaging activity that was determined to be fraudulent in the Historical Data 472. For example, in an exemplary embodiment, the Historical Data 472 can include location-based messaging pattern data, including messages to specific phone numbers, area codes, states, countries, or email addresses around the world. In the exemplary embodiment, if a country has a known history or pattern of originating or receiving fraudulent messaging activity, this information can be stored in the Historical Data 472 so that messages to that country may be placed under stricter scrutiny. Therefore, any number of factors can be recorded in the Historical Data 472 and any number of these recorded factors can be used by the Fraud Monitoring Service 470 to analyze messaging patterns initiated by one or a group of user accounts and/or devices 410 to interrupt fraudulent calling activities.

The Fraud Monitoring Service 470 can dynamically adjust fraud indicators based on user settings and/or Historical Data 472. For example, a message threshold can be varied based on time of day, such as off-peak hours. This also allows the Fraud Monitoring Service 470 to dynamically adjust fraud indicators based on Historical Data 472, including previously observed patterns and statistical data. Furthermore, different fraud indicators can be defined for different users or groups. The different fraud indicators can be based on the previous Historical Data 472 of the group or the previous Historical Data 472 of the service provider.

The Fraud Monitoring Service 470 can combine one or more fraud indicators available in the Fraud Indicator Configuration Data 476 and the Historical Data 472 in its analysis of outgoing messages. For example, the Fraud Monitoring Service 470 may consider multiple messages within a short time period to certain high-fraud risk countries, after business hours, to be indicative of fraudulent messaging activity. Any number of factors could be combined in any number of ways to trigger the Fraud Monitoring Service 470 to detect potential fraud associated with a user account and/or device 410. The Fraud Monitoring Service 470 can also be configured such that if multiple thresholds are exceeded for one or more fraud indicators, then the outgoing message is not sent.

The Fraud Monitoring Service 470 dynamically monitors the messaging activity of one or a group of user accounts and/or devices 410 within a Messaging System Network 420 and then compares the messaging activity to the configured fraud indicators. The Messaging System Network 420 is a system of network components the facilitate the transmission of SMS, MMS, Instant Messages, and other Internet or telephony-based messages over the Internet, PSTN, Cellular, Public Land Mobile Network (PLMN), wireless and other electronic networks. The Messaging System Network's 420 purpose is to store, forward, convert and deliver messages via the various networks. The Messaging System Network 420 can comprise one or more Message Service Centers 440 that act as a gateway for communicating with the Internet, PLMN, PSTN and other electronic networks. A Signal Transfer Point (STP) 445 is provided for routing communications traffic within the Messaging System Network 420 among its various components. For example, one or more Mobile Switching Centers 450 are provided for routing voice calls, SMS, MMS, as well as other services (e.g. conference calls, fax and circuit switched data). The Mobile Switching Centers 450 establish and release the end-to-end messaging, handle mobility and hand-over requirements during a message and are responsible both for charging accounts and real-time account monitoring. Furthermore, the Mobile Switching Centers 450 are in communication with the STP 445, a Provisioning Server 452 and a Connected Storage Device 458 that is comprised of Message Logs 455. The Message Logs 455 contain records of messages sent or received over the Messaging System Network 420. The Messaging System Network 420 is further comprised of one or more Visitor Location Registers (VLR) 465, which comprise a database of subscribers who have roamed into the jurisdiction of the Mobile Switching Centers 450 that the VLR 465 serves. The VLR 465 is in communication with the other Messaging System Network 420 components via the STP 445. A Home Location Register (HLR) 460 is also provided. The HLR 460 is a central database that contains data and specifications of each subscriber (i.e. user accounts and/or devices 410) that is authorized to use the Messaging System Network 420. The HLR 460 is in communication with the other Messaging System Network 420 components via the STP 445, and it works in concert with the Provisioning Server 452 and Message Service Center 440 to provide user account and/or device 410 authentication.

The Messaging Fraud Mitigation System 400 can communicate with any one of the Messaging System Network 420 components via programmatic network interfaces using application communication protocols, such as Hypertext Transfer Protocol (HTTP), Open Database Connectivity (ODBC), Simple Network Management Protocol (SNMP), etc. In an embodiment, the telephony service provider's network comprises server-side instructions (e.g. Java module) executing within the Fraud Monitoring Service 470. These instructions allow the Fraud Monitoring Service 470 to frequently poll the Message Logs 455, where SMS, MMS or other messaging activity is logged. Therefore, the Fraud Monitoring Service 470 via the Messaging System Network 420 is able to monitor the messaging activity occurring on a user account and/or device 410. In a further embodiment, the instructions allow the Fraud Monitoring Service 470 to poll the Message Service Center 440 for activity or logs.

In an embodiment, the Fraud Monitoring Service 470 monitors the operations of the Mobile Switching Center 450 or accesses the Message Logs 455 stored within the Connected Storage Device 458 that is in communication with the Mobile Switching Center 450. If certain messaging activities exceed predefined thresholds, a fraud alert can be triggered. In a further embodiment, the Fraud Monitoring Service 470 can access the Home Location Register (HLR) 460 or the Visitor Location Register (VLR) 465 to monitor for fraudulent activity. The HLR 460 is the main database of permanent subscriber information for the mobile network. The HLR 460 contains pertinent information related to the user accounts and/or devices 410, including address, account status, and preferences. If information related to messaging activity occurring within the Messaging System Network 420 is not consistent with the credential information stored within the HLR 460, a fraud alert can be triggered. In a further embodiment, if messaging activity occurring on one or a group of user accounts and/or devices 410 within the Messaging System Network 420 meets or exceeds the fraud indication thresholds or if the activity triggers fraud indicators defined for the network or subscriber, then the Fraud Monitoring Service 470 triggers a fraud alert. This fraud alert is forwarded to the other Messaging Fraud Mitigation System 400 components 480, 484, and 488 so that mitigation actions can be taken.

Occurrences of fraudulent messaging activity (such as the number of messages to a particular phone number or area code or country code sent within a certain period of time) are recorded as Historical Data 472 to prevent similar fraudulent messaging activity from occurring in the future. For example, in an embodiment, occurrences of fraudulent messaging activity can include messages to a particular phone number or address; messages that are sent at specific intervals to specific destinations, etc. Once stored in Historical Data 472, future attempts to send messages of the same type could trigger a fraud alert. In a further embodiment, these repeated occurrences that are recorded in the Historical Data 472 can be made applicable to multiple user accounts and/or devices 410 that access the Messaging System Network 420, thereby enabling the Fraud Monitoring Service 470 to prevent this activity from occurring on other user accounts and/or devices 410. Furthermore, this enables the Destination Blocking Service 488 to block all future messages to destinations associated with fraudulent messaging activity.

The Destination Blocking Service 488 can provide message blocking across all user accounts and/or devices 410 via communications sent to the Messaging System Network 420. In an embodiment, the Destination Blocking Service 488 can send a message to the Mobile Switching Center 450 via the Fraud Monitoring Service 470 indicating that all messages to a specific phone number or area code or country code should be blocked. The Destination Blocking Service 488 can be software executing on a server, a specialized server, or a distributed network of specialized servers. In an embodiment, the Destination Blocking Service 488 via the Messaging System Network 420 can also limit its destination blocking via more fine-grained methods, such as blocking all messages during specific time periods, for example on weekends and/or between the hours of 1 am and 6 am; blocking all messages to a specific location or address during defined time periods (e.g. after normal work hours, nights, weekends); and/or blocking certain types of messages, such as those being forwarded to long distance numbers or outside of the VoIP provider's network, during specific time periods that have historically had a strong propensity to indicate fraudulent activity.

In a further embodiment, the Messaging Fraud Mitigation System 400 includes a Message Termination Service 480. Having received a fraud alert message from the Fraud Monitoring Service 470, the Message Termination Service 480 relies on information in the fraud alert message to identify the devices and calling locations where fraud is presumed to be occurring or has recently occurred. The Message Termination Service 480 via the Messaging System Network 420 can immediately terminate all in-process messages originating from user accounts and/or devices 410 where the presumed fraud was detected.

The Fraud Monitoring Service 470 analyzes both Historical Data 472 and information from the Fraud Indicator Configuration Data 476 to make a determination as to whether a current outgoing message is fraudulent. If the message is deemed fraudulent the Message Termination Service 480 can terminate the message. The Message Termination Service 480 can be software executing on a server, a specialized server, or a distributed network of specialized servers. Therefore, if an affected user account and/or device 410 has an authorized, active, outgoing message that is in process, and a Hacker Device 415 is able to infiltrate the same user account and/or device's 410 credentials to engage in fraudulent activity during the same time, the Fraud Monitoring Service 470 is capable of distinguishing the authorized messaging activity over the potentially fraudulent messaging activity that is originating from the user account and/or device 410. The Fraud Monitoring Service 470 can engage the Message Termination Service 480 to terminate the fraudulent activity originating from the affected user account and/or device 410 while allowing the authorized message originating from the user account and/or device 410 to proceed. The Fraud Monitoring Service 470 can analyze activity originating from a user account and/or device 410 to determine whether it is authorized based upon previous messages to a regularly messaged phone number found in the Message Logs 455. Messages to a regularly messaged phone number from user accounts and/or devices 410 can be deemed to be an authorized outgoing communication. Therefore, in an embodiment, the Message Termination Service 480 will only terminate those messages that are determined to be fraudulent, while allowing other authorized messages originating from the affected user accounts and/or devices 410 to remain active. In an embodiment, the Message Termination Service 480 may forward an alert to the Mobile Switching Center 450 via the Fraud Monitoring Service 470 to terminate specific outgoing messages identifying the user accounts and/or devices 410 and the phone number to which one or messages are being sent. In a further embodiment, the Message Termination Service 480 may forward an alert to the Mobile Switching Center 450 via the Fraud Monitoring Service 470 to terminate all outgoing messages. However, the pending outgoing messages may be stored in the Message Logs 455 and Historical Data 472 so that they can be analyzed and compared to determine if they meet fraudulent messaging criteria (e.g. the destination address was previously stored in historical data as a fraudulent address). If the message is not determined to be fraudulent, it can be stored in the Message Logs 455 and resent by the Messaging System Network 420 after the credentials have been reset. All other outgoing messages (determined to be fraudulent) can be deleted. Therefore, the authorized message would proceed, while other messages, deemed to be fraudulent, would be terminated.

The Message Termination Service 480 can force the end of a message broadcast in a variety of ways. For example, the Message Termination Service 480 can force the termination of messages via an API made available by the Mobile Switching Center 450 or the VoIP PBX 135 with message control capabilities. If necessary the Message Termination Service 480 can terminate the message broadcast at the affected user account and/or device 410, by sending an API for a message termination or "hang-up" or "stop" request to the affected user account and/or device 410.

A Credential Reset Service 484 is provided to prevent future fraudulent messaging activity. The Credential Reset Service 484 can be software executing on a server, a specialized server, or a distributed network of specialized servers. The Fraud Monitoring Service 470 via the Messaging System Network 420 identifies the user accounts and/or devices 410 from which a presumed hacker or Hacker Device 415 has obtained a user's device 410 or the user device's credentials to send fraudulent messages via the user accounts and/or devices 410. Once the Credential Reset Service 484 receives a fraud alert message from the Fraud Monitoring Service 470, the Credential Reset Service 484 sends a credential reset alert to the Provisioning Server 452. The Provisioning Server 452 receives the credential reset alert and generates new access credentials for the compromised user accounts and/or devices 410. The Provisioning Server 452 delivers these new access credentials to the HLR 460 via the Mobile Switching Center 450 and STP 445. Once the HLR 460 receives these new access credentials, it can push the credentials out to the user devices 410 as described below in the discussion of the push, pull, or push-pull methods used in provisioning.

In an embodiment, the Messaging System Network 420 and the Messaging Fraud Mitigation System 400 are capable of sending instructions and APIs to a user account and/or device 410 via a Push, Pull or Push-Pull method. This Push, Pull or Push-Pull method can be facilitated by messaging gateways that are both integral to a telephony service provider's network and for messaging gateways that are provided via third-party services. The user accounts and/or devices 410 can communicate with the Message Service Center 440, the Mobile Switching Center 450, the Provisioning Server 452, and the HLR 460 via a Push, Pull or Push-Pull method. Push, Pull and Push-Pull are methods of automated device communications within the Messaging System Network 420. These methods can be specific to the user account and/or device's 410 operating system or the network system. A push occurs when a network component pushes (i.e. sends) credentials, instructions, or other data out to a user account and/or device 410. A pull occurs when a user account and/or device 410 requests credentials, instructions, or other data from a network component or user account and/or device 410. Consequently, a Push-Pull operation occurs when both of the actions occur synchronously. In an embodiment, the Provisioning Server 452 generates network access credentials (e.g. messaging access identifier and password) for a user account and/or device 410. These access credentials allow the user account and/or device 410 to communicate with the Messaging System Network 420 that is provided by the user account and/or device's 410 service provider. These access credentials may be different from the user account and/or device 410 credentials used to access other services via their VoIP, messaging, or telephony service provider. The Push, Pull or Push-Pull methods described above are also applicable to VoIP calling via user phones 105 as described in the discussions of FIGS. 1-3 above. Once the messaging access credentials are generated, they are passed through the Mobile Switching Center 450 and the STP 445 and stored within the HLR 460.

The HLR 460 sends these messaging access credentials via the STP 445 to the Message Service Center 440. The Message Service Center 440 can then push these messaging access credentials out to a user account and/or device 410. Similarly, in an embodiment, a user account and/or device 410 can request messaging access credentials by sending a pull request to the Message Service Center 440; the pull request is passed through the STP 445 to HLR 460. The HLR 460 is capable of verifying some preliminary authentication information about the user account and/or device 410 using such information as the originating IP address, the serial number, or packet header of the user account and/or device 410. Once this preliminary authentication information is verified, the HLR 460 via the STP 445 and Mobile Switching Center 450 can query the Provisioning Server 452 for new access credentials. Once the Provisioning Server 452 provides these credentials, the HLR 460 via the STP 445 and Mobile Service Center 440 can return or push these credentials back out to the user account and/or device 410. In an alternative embodiment, messaging access credentials may be stored within the HLR 460 and accessed by the user account and/or device 410 via Mobile Service Center 440 and the STP 445. In a further embodiment, a push-pull operation can occur when the user account and/or device 410 pushes information out the Messaging System Network 420. This information can include information regarding the current status of the user account and/or device 410. In response, components within the Messaging System Network 420 may determine that certain information should be updated on the user account and/or device 410. For example, the HLR 460 may determine that a message token (which is a representation of a user account and/or device's 410 messaging access credentials, and explained in detail below) for user account and/or device 410 has expired. Therefore, the HLR 460 may push a new access token to the user account and/or device 410 via the STP 445 and the Message Service Center 440.

The Provisioning Server 452 can also assign other pertinent configuration information such as the messaging access identifier and password or messaging Token. The Provisioning Server 452 can also assign to the user accounts and/or devices 410, new address credentials for communicating with the Messaging System Network 420, including a new DNS location or IP address for accessing the Messaging System Network 420. Furthermore, the Provisioning Server 452 can configure the user accounts and/or devices 410 with additional configuration settings including an alternative connection point, such as directing the user account and/or device 410 to a new messaging access IP address or DNS location port for a different Message Service Center 440.

In an embodiment, the HLR 460 in concert with the Message Service Center 440 via the STP 445 can create a secure channel 417 with the user accounts and/or devices 410 by authenticating the user accounts and/or devices 410 using serial numbers, subscriber identity modules (SIM), international mobile subscriber identity (IMSI), personal identification numbers (PIN), an account identifier and account password combination, and the like. The Provisioning Server 452 can also issue other configuration changes to the targeted user account and/or device 410 in order to protect against further fraud. In an embodiment, the user account and/or device 410 receives a special API call or other signal from the Provisioning Server 452 via the Mobile Switching Center 450, STP 445, and Message Service Center 440 to provide these new access credentials over the secure channel 417. In an exemplary embodiment, the user account and/or device 410 is capable of "hot-swapping" the old login credentials for the new login credentials. Therefore, once the user account and/ or device 410 receives the new access credentials via the secure channel 417, the user account and/or device 410 can then automatically send an API request to the Messaging System Network 420 requesting that the user account and/or device 410 be re-authenticated with the Messaging System Network 420. This Messaging System Network 420 via the Message Service Center 440, the STP 445 and the HLR 460 would then re-authenticate the user account and/or device 410. This means authorized users of the user accounts and/or devices 410 can continue to use their devices with potentially no or minimal down time.

In an embodiment, some user accounts and/or devices 410 may not be able to receive new credentials via a push or pull method as described above. This situation occurs when the user account and/or device 410 attempts to access the Messaging System Network 420, but it is notified that it no longer has valid access credentials. The user account and/or device 410 can then request new credentials via a secure channel 417 as described above. Once the secure channel is established, the new access credentials can be provided to the device user account and/or device 410. However, the operating systems powering some user accounts and/or devices 410 may require a reboot for these new access credentials to take effect. In these instances, for the affected user accounts and/or devices 410, any pending outgoing message will continue to be sent; however, once the pending outgoing message is delivered, the user will be required to reboot or re-authenticate the user account and/or device 410 before another message can be sent from the device. In other embodiments, a signal sent from the Provisioning Server 452 can automatically reboot or reinitiate a user account and/or device 410 either once the signal is received at the user account and/or device 410 or once an authorized user of the user account and/or device 410 completes an outgoing message.

In a further embodiment, the Provisioning Server 452 issues login and other network access credentials to the user accounts and/or devices 410. In an embodiment, the Provisioning Server 452 can dynamically assign, revoke, and/or change access credentials of the user accounts and/or devices 410 connected to the Messaging System Network 420. In one configuration, a user account and/or device 410 can contain instructions to periodically "ping" the Provisioning Server 452 to verify that the user account and/or device 410 credentials are still current and active. Once a user account and/or device 410 is deemed to have been compromised, then the Provisioning Server 452 can dynamically and automatically reassign network access credentials of the user account and/or device 410 without user or operator intervention. These new or reassigned network access credentials can result in the termination of all active outgoing messages for the user account and/or device 410. However, in an alternative embodiment, the Message Termination Service 480 can instruct the Provisioning Server 452 to delay reassignment of the network access credentials until after an authorized message from the user account and/or device 410 is terminated. However, the Message Termination Service 480 can still identify a potentially fraudulent message originating from the user account and/or device 410 and abort it while it is in process, without affecting the authorized message.

In an embodiment, to communicate with the Messaging System Network 420 using the messaging APIs, a sender's credentials are initially authenticated with a valid messaging ID and messaging Password. Upon successful authentication, the Messaging System Network 420 via the Provisioning Server 452 returns to the sender a message token that can be used for subsequent messaging API requests. The Messaging System Network 420 can subsequently invalidate the message token for various reasons, including for example, session timeout (i.e. the token expires after a predetermined time period), in which case the messaging API would notify the sender via their user account and/or device 410 that the message token presented is no longer valid. The sender would then need to re-authenticate their user account and/or device 410 to obtain a new valid message token. The message token described above is also applicable to the VoIP calling via user phones 105 as described in the discussions of FIGS. 1-3 above.

As described above, the Provisioning Server 452 can facilitate the authentication of the user accounts and/or devices 410 via the use of message tokens. A message token is a representation of a user account and/or device's 410 messaging access identification and password. Message tokens (i.e. access tokens) are well known in the art and tend to include additional security features. For example, message tokens may be designed to be used once, to expire within a predetermined time period, or to control user's access to various messaging features (e.g. ability to send multimedia messages) while authenticated on the system. For more details on access tokens see Microsoft White Paper published Mar. 28, 2003 entitled "How Access Tokens Work," by the Microsoft TechNet Library. The messaging access identification and passwords (or message token) are required for user account and/or device 410 authentication on the Messaging System Network 420. The Provisioning Server 452 manages the messaging access credentials for the user accounts and/or devices 410 within the Messaging System Network 420 by assigning and revoking messaging access identification and passwords and/or message tokens. The Provisioning Server 452 authenticates the user account and/or device 410 to allow it to send and receive messages on the Messaging System Network 420 using either a combination of messaging access identification and password or a message token.

In an embodiment, the Provisioning Server 452 issues a message token to a user account and/or device 410 each time a new user account and/or device 410 is authenticated to the Messaging System Network 420. The message tokens are delivered to the user accounts and/or devices 410 via the secure network 417 process described above. The Provisioning Server 452 is configured to automatically issue, suspend or revoke the messaging tokens based on changes to a user account and/or device 410 VoIP service subscription, account status, time/day access restrictions, or a fraud alert. If the user account and/or device 410 is suspended from the Messaging System Network 420, the message token is automatically revoked by the Provisioning Server 452. Therefore, in an embodiment, the Credential Reset Service 484 can reset access credentials for an authorized user account and/or device 410 and then revoke its current message token to ensure that the new access credentials must be used for any further access.

The Provisioning Server 452 can issue new credentials and related data securely to the user accounts and/or devices 410 in a variety of ways, including but not limited to: staging them on a secure server to which only authorized user accounts and/or devices 410 can connect and which the accounts and/or devices 410 can poll frequently for updates; sending them directly over the network to the user accounts and/or devices 410 where the device IP addresses are known and accessible to the Credential Reset Service 484 and where an interface for the delivery of such information exists on the device; via an HTTP-based API; or via a Push, Pull or Push-Pull method as described above. In an embodiment, the Provisioning Server 452 automatically creates access credentials including messaging IDs, messaging passwords and message tokens so that they can be provisioned to an authorized user account and/or device 410 of an authorized application (such as an application on a smartphone or desktop computer) from the Messaging System Network 420. The credentials may be provisioned via a pull request from the device or application upon an indication from the Messaging System Network 420 that the credentials of the user account and/or device 410 are no longer valid, using an HTTP-based or non-HTTP-based provisioning API, or they might be pushed to a device or application using a push messaging mechanism such as those provided by mobile device operating system manufactures including for example, Apple, Inc.® and Google, Inc.® for pushing notifications to iOS® and Android® applications. In some embodiments, the messaging ID and messaging password need not be readily available or visible to the user. Rather, they may be passed entirely in the background, both when they are initially pushed/pulled to the user account and/or device 410, and later when they are presented by the user account and/or device 410 back to the Messaging System Network 420 to validate authorization to send messages. In an embodiment, the access credentials provisioned to an authorized user account and/or device 410 may be obtained by an application running on a client device such as a smartphone or desktop computer via an API call to the Messaging System Network 420 and then stored within the application on the client device without being exposed or visible to the application user.

In an embodiment, the Provisioning Server 452 can further provide a file store for the user accounts and/or devices' 410 configuration files since there are different formats for different types of phones, devices and accounts according to the manufacturer requirements. Each account and/or device 410 has a DNS or IP address for its configuration file which is addressable via the Provisioning Server 452 and these user accounts and/or devices 410 reference these configuration files via the Mobile Switching Center 450, STP 445, and Message Service Center 440 at a configurable intervals via a known network connection protocol such as file transfer protocol (FTP) or HTTP. The Provisioning Server 452 may also contain instruction code to periodically "ping" the user accounts and/or devices 410 via the Mobile Switching Center 450, STP 445, and Message Service Center 440 and the secure connection 417 so that their messaging credentials or tokens can be automatically changed frequently and immediately. In an alternative embodiment, the Provisioning Server 452 can periodically send a signal via the Mobile Switching Center 450, STP 445, and Message Service Center 440 to user accounts and/or devices 410 that can trigger a credential change that requires a reboot (e.g. typically after business hours). These frequent and periodic credential changes can make it very difficult to hack the Messaging System Network 420.

As mentioned above, a Destination Blocking Service 488 is also provided. Once the Fraud Monitoring Service 470 generates a fraud alert, the Destination Blocking Service 488 can be activated. The fraud alert identifies the user accounts and/or devices 410 as well as, messaging addresses or destinations where fraud is presumed to have recently occurred and where fraud may be still be occurring. The Destination Blocking Service 488 can immediately take action to block further messages from the potentially compromised user accounts and/or devices 410 to the targeted addresses or destinations. Destinations might be granular, such as a specific phone number or specific email address; or more general, such as area code, country code, a continent or even a universal resource locater address (URL). The Destination Blocking Service 488 could be used to block all messages to a location across all user accounts and/or devices 410. For example, if a number of user accounts and/or devices 410 are compromised and the Fraud Monitoring Service 470 detects multiple user accounts and/or devices 410 all messaging similar target destinations (e.g. country codes, area codes or domain names), then the Destination Blocking Service 488 can completely block all messages to that address or destination (e.g. country codes, area codes, or domain name) regardless of the user accounts and/or devices 410 being used. The Destination Blocking Service 488 can implement message blocking in a variety of ways, such as by communicating with the Mobile Switching Center 450 via the Fraud Monitoring Service 470 through an API to register the message blocking rules (e.g. the blocked addresses and destinations) for the user accounts and/or devices 410 or a group of user accounts and/or devices 410. The Destination Blocking Service 488 can store the blocked addresses and destinations within the Historical Data 472 for future reference by Fraud Monitoring Service 470.

In an embodiment, if the Fraud Monitoring Service 470 detects potential fraudulent messaging activity occurring within one or more user accounts and/or devices 410, the Fraud Monitoring Service 470 performs the following actions:

1) It communicates with the Mobile Switching Center 450 to prompt it to abort any in-process (i.e., in queue within the system) outgoing messages sent using the user accounts and/or device's 410 messaging ID.
2) It communicates with the Provisioning Server 452 to have it immediately invalidate any existing message token associated with the messaging ID and password and to have it automatically provision new credentials, which would at least be a new messaging password but might also be a new messaging ID.

In an embodiment, the newly provisioned credentials are automatically provisioned to legitimate and authenticated user accounts and/or devices 410 (e.g. user applications) either immediately or upon next attempt by the user accounts and/or devices 410 to communicate with the Messaging System Network 420. As discussed above, the newly provisioned credentials may be pulled or pushed. In a further embodiment, the Fraud Monitoring Service 470 can send a notification of potential fraud via some messaging system (such as email or SMS) to appropriate parties (such as the service provider) for follow-up action.

Since the messaging token has been invalidated and the messaging credentials (i.e. messaging ID and password) have been changed, a hacker or hacker device 415 will be unable to send further fraudulent messages using the hijacked credentials. However, a legitimate user account and/or device 410 that has been authenticated is automatically provisioned with a new message ID and password. The legitimate user account and/or device 410 could then continue sending messages.

Figure 5:
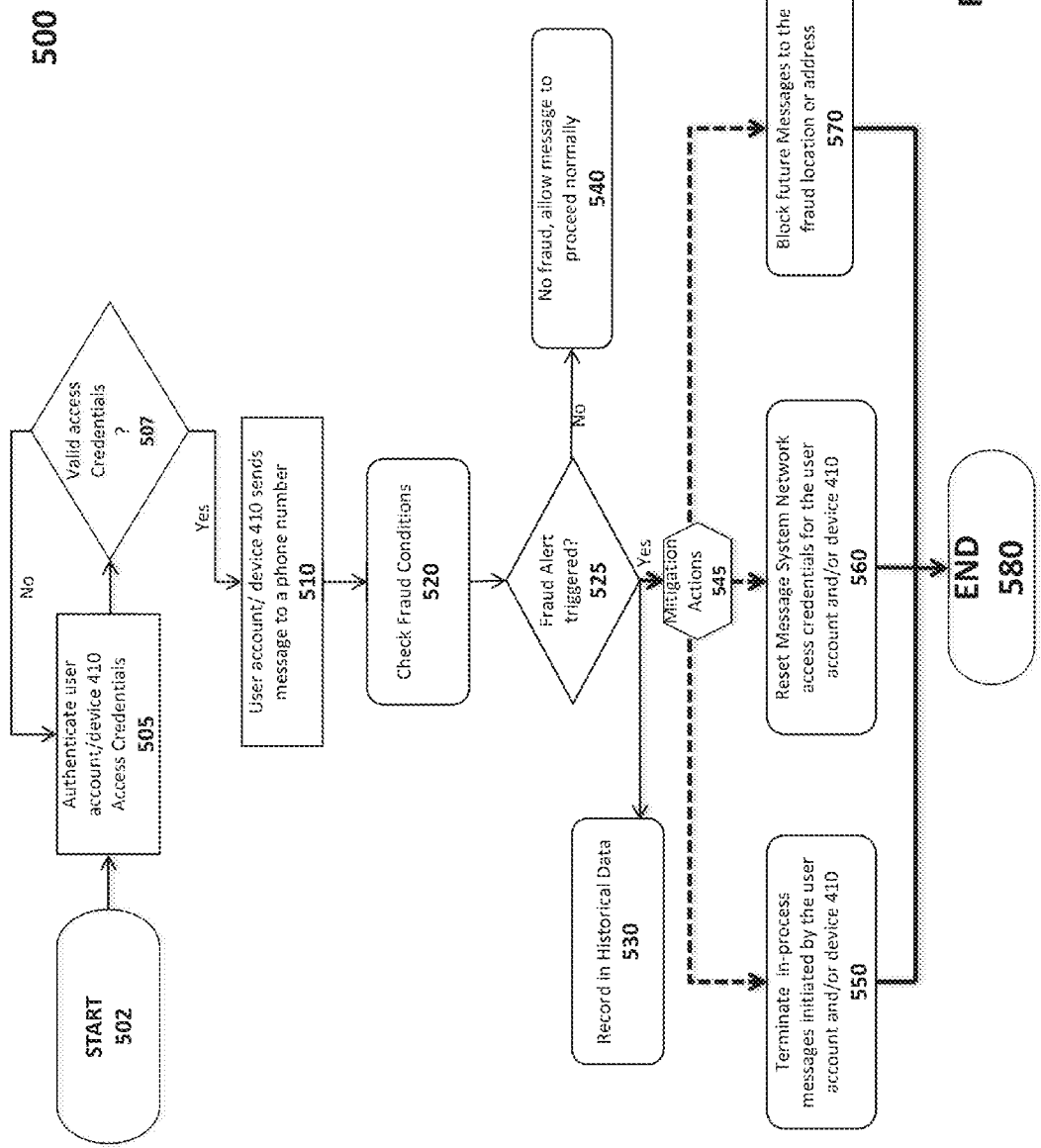
FIG. 5 is a flowchart of an exemplary embodiment of a method of messaging fraud mitigation in accordance with the subject invention.

Turning now to FIG. 5, a flowchart diagram of a method 500 for mitigating messaging fraud is provided. The method is described in association with the Messaging Fraud Mitigation System 400 described above. Beginning at step 502 and proceeding to step 505, a user account and/or device 410 is authenticated for sending communications across the Messaging System Network 420 using valid messaging ID, message Password or message Token credentials authorized for use on the Messaging System Network 420 or VoIP PBX 135. If the user account and/or device 410 fails to provide valid access credentials, the authentication process starts over at step 505. However, if the user account and/or device 410 provides valid access credentials then the user account and/or device 410 is granted access to the Messaging System Network 420 and the method proceeds on to step 510.

At step 510, the user account and/or device 410 sends a message to a phone number or address via the Messaging System Network 410 using SMS, MMS or other messaging protocols. The method then proceeds to step 520.

At Step 520 the message being routed through the Messaging System Network 420 is monitored for fraud conditions, articulated in the system description discussion of FIG. 4 above. The Fraud Monitoring Service 470 analyzes all messages flowing through the Mobile Switching Center 450, Message Logs 455 and the Message Service Center 440 for activities that match previously defined fraudulent activity, exceed fraud threshold conditions, or match fraud indicators at step 520. Previously defined fraudulent activity can include historical patterns that were determined to be fraud, such as sending bursts of messages at specific intervals or forwarding messages to specific address and locations that were previously determined to be fraudulent. Fraud threshold conditions can include, for example, the quantity of messages sent or the costs of messages sent within a predetermined period of time. Fraud indicators can include, for example, messages sent after normal business hours or on the weekends. This analysis is dynamic and ongoing as messages flow through the Messaging System Network 420. If any of the messages flowing through the Messaging System Network 420 match the previously defined fraudulent activity, exceed fraud threshold conditions, or match fraud indicators, then a Fraud Alert is triggered at step 525.

At step 525 a determination is made as to whether the message sent by the user account and/or device 410 through the Messaging System Network 420 matches the previously defined fraudulent activity, exceeds fraud threshold conditions, or matches fraud indicators. If the message does not match previously defined fraudulent activity, exceed fraud threshold conditions, and/or match fraud indicators, the message is allowed to proceed normally at step 540. However, if the message matches the previously defined fraudulent activity, exceeds fraud threshold conditions, and/or matches fraud indicators, a fraud alert is triggered. Once a fraud alert is triggered, information related to the fraudulent messaging activity is recorded in the Historical Data at step 530. The method proceeds to step 545.

At step 545 at least one of three fraud mitigation actions is taken, including: Terminating in-process messages initiated by the user account and/or device 410 at step 550; Resetting Message System Network 420 access credentials for the user account and/or device 410 at step 560; or Blocking future Messages to the fraud location or address at step 570.

At step 550, the fraud alert is passed to the Message Termination System 480. The Message Termination Service 480 acts immediately to terminate all in process messages initiated by the affected user accounts and/or devices 410. The Message Termination Service 480 can issue instructions via the Fraud Monitoring Service 470 to the Mobile Switching Center 450, the Message Service Center 440 or to the user accounts and/or devices 410 to terminate in process messages from the affected user accounts and/or devices 410. These instructions may be sent via APIs or via a push/pull notification disclosed in the discussion of FIG. 4 above.

At step 560, the fraud alert is passed to the Credential Reset Service 484. The Credential Reset Service 484 contacts the Provisioning Server 452 via the Fraud Monitoring Service 470 and Mobile Switching Center 450 and orders it to reset the credentials of the affected user accounts and/or devices 410 that are registered with the Messaging System Network 420. The Provisioning Server 452 to immediately issues new messaging access credentials or messaging tokens for authentication on the Messaging System Network 420 for the potentially compromised user accounts and/or devices 410. The credential changes are handled through a secure channel 417 or via push/pull methods to the affected user accounts and/or devices 410 as disclosed in the discussion of FIG. 4 above.

At step 570, the fraud alert is sent to a Destination Blocking Service 488. The Destination Blocking Service 488 receives the fraud alert and analyzes the messaging data to determine the destinations of the fraudulent messaging activity. The destination information for the potentially fraudulent messages can be granular, such as a specific phone number or email address. This destination information for the messages can also be more general, such as a calling area code, country code, or universal resource locator (URL) address. The Destination Blocking Service 488 can issue instructions via the Fraud Monitoring Service 470 to the Mobile Switching Center 450 to immediately takes action to block further messages from user accounts and/or devices 410 connected to the Messaging System Network 420. The Destination Blocking Service 488 can record this information in Historical Data 472 such that the Messaging System Network 420 can block all future fraudulent messaging activity associated with a particular messaging destination as disclosed in the discussion of FIG. 4 above. The method 500 ends at step 580.

Note, in an alternate embodiment of the invention, the activities occurring in steps 550-570 may occur sequentially, simultaneously or in any combination thereof. This allows the components of the Messaging Fraud Mitigation System 400 to work together to immediately stop fraudulent activity while allowing authorized owners of the user accounts and/or devices 410 to continue to use their devices with minimal interruption.

Figure 6:
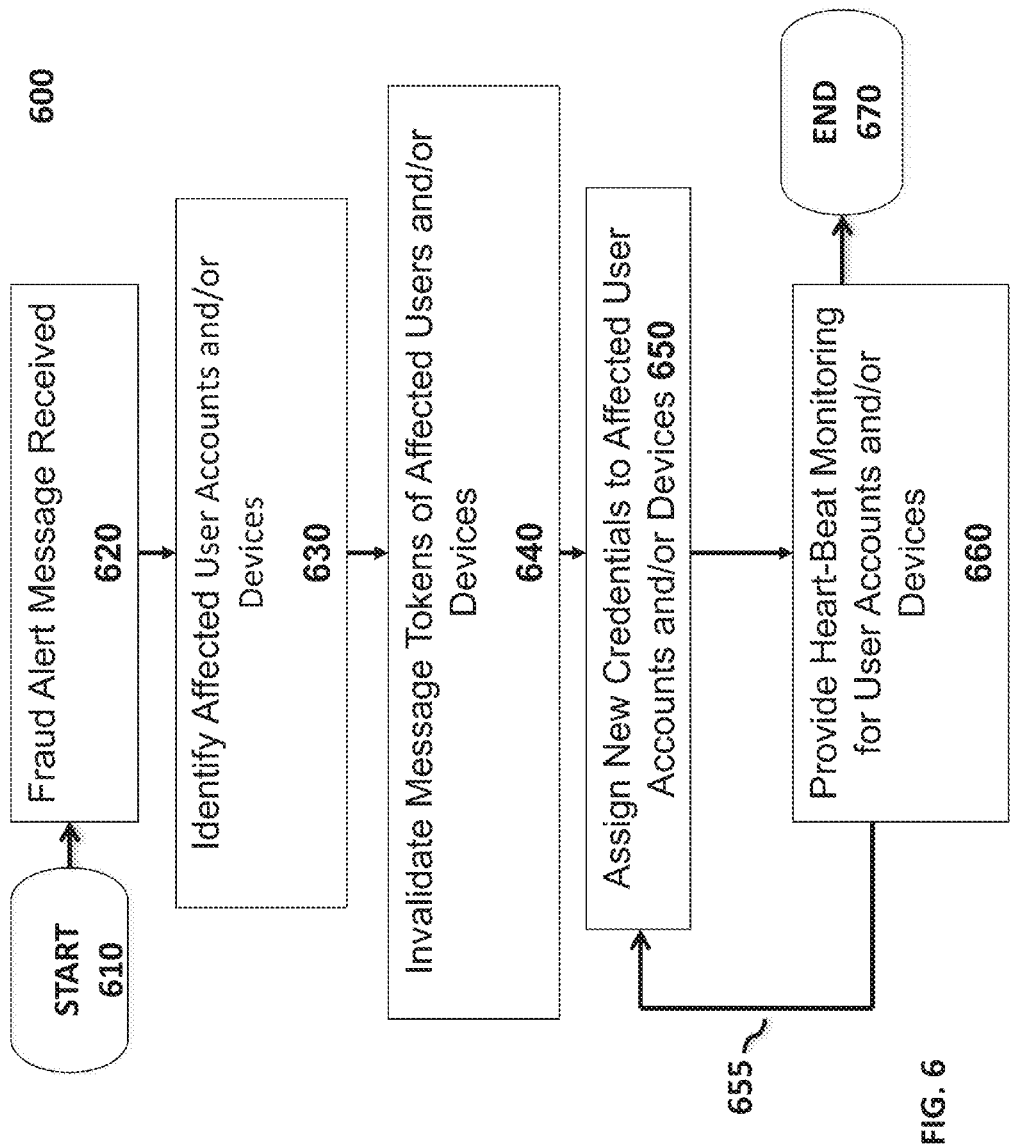
FIG. 6 is a flowchart of an exemplary embodiment of a method for performing credential reset for messaging systems in accordance with the subject invention.

Turning now to FIG. 6, a method 600 of resetting device or application credentials based upon a fraud mitigation alert is provided. The method is described in association with the Messaging Fraud Mitigation System 400 described above. Beginning at step 610 and proceeding to step 620 the Credential Reset Service 484 receives a fraud alert message from the Fraud Monitoring Service 470. The fraud alert message contains information for identifying the affected user accounts, applications or devices 410. The Credential Reset Service 484 then acts on this information to stop the fraudulent activity.

At step 630, the Credential Reset Service 484 parses the fraud alert message to identify the affected user accounts and/or devices 410. The user accounts and/or devices 410 can be identified with the alert message by a packet header in the message that identifies the affected user account via its address, phone number, serial numbers, subscriber identity modules (SIM), international mobile subscriber identity (IMSI), personal identification numbers (PIN), an account identifier and account password combination, and the like. The identified user accounts and/or devices 410 can include an individual device, a group of devices or messaging applications.

At step 640, the Credential Reset Service 484 sends a message to the Provisioning Server 452 via the Fraud Monitoring Service 470 to invalidate the message tokens for the affected user accounts and/or devices 410.

At step 650 the Credential Reset Service 484 sends a message to the Provisioning Server 452 via the Fraud Monitoring Service 470 to reset the credentials and automatically assigns new user names and passwords for the affected user accounts and/or devices 410. In addition, the Credential Reset Service 484 can also send a message to the Provisioning Server 452 via the Fraud Monitoring Service 470 to assign a new message token or new IP address and/or DNS locations for the affected user accounts and/or devices 410.

In an embodiment, at step 660 the Credential Reset Service 484 provides Heart-Beat Monitoring to the user accounts and/or devices 410 by periodically verifying that the user accounts and/or devices 410 are securely connected to the network and have not been tampered with. Therefore, the Credential Reset Service 484 monitors the user accounts and/or devices 410 for other suspicious activity, including but not limited to, an IP address change or a DNS location change, for example. This monitoring can take place continuously by allowing the Provisioning Server 452 to periodically "ping" the user accounts and/or devices 410 to ensure they are securely connected to the Messaging System Network 420. In a further embodiment, the Provisioning Server 452 periodically updates the credentials of the user accounts and/or devices 410 by assigning new credentials to these devices. Furthermore, individual user accounts and/or devices or a group of user accounts and/or devices 410 that have been consistently targeted by hackers or hacker devices 415, may receive special attention from the Provisioning Server 452, such that their credentials are more frequently updated, either on an ongoing basis or for a set period of time, via a feedback loop at step 655. The method 600 ends at step 670.

Figure 7:
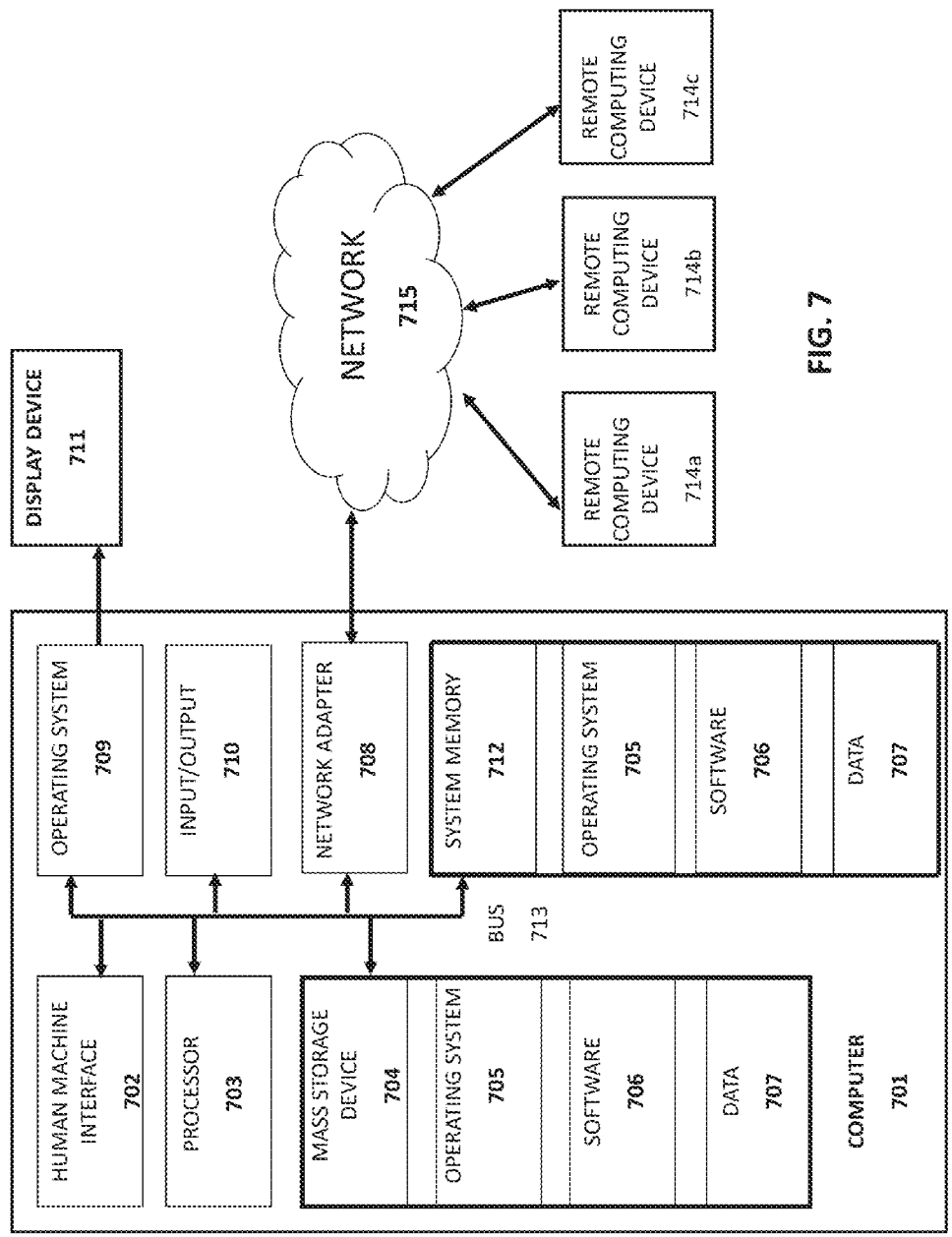
FIG. 7 is a block diagram of an exemplary computing environment that may be used in conjunction with example embodiments and aspects.

Turning now to FIG. 7, one skilled in the art will appreciate that the systems and methods disclosed herein can be implemented via a general-purpose computing device in the form a computer 701. For example, the user devices 410, components of the Messaging System Network 420, and the components of the Fraud Messaging Mitigation System 400 may each comprise a computing device as described in FIG. 7. The components of the Messaging System Network 420, and the components of the Fraud Messaging Mitigation System 400 may each comprise a network of computing devices or a network distributed computing devices. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, software 706, data 707, a network adapter 708, system memory 712, an input/output interface 710, a display adapter 709, a display device 711, a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that are accessible by the computer 701 and comprise, for example, both volatile and non-volatile media, as well as, removable and non-removable media. The system memory 712 comprises computer readable media in the form of volatile memory, such as random access memory (RAM), and/or non-volatile memory, such as read only memory (ROM). The system memory 712 may contain data such as media, video, audio, or other data 707 and/or program modules such as an operating system 705 and software 706 capable of manipulating, translating, transcoding, or otherwise editing the data 707 that are immediately accessible to and/or presently operated on the by the processing unit 703.

In another aspect, the computer 701 can also comprise other removable/non-removable, volatile/non-volatile computer storage media. By way of example, FIG. 7 illustrates a mass storage device 704, which can provide non-volatile storage of computer code, computer readable instructions, data structures, program modules and other data for the computer 701. For example, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and hosted VoIP PX software 706. Both the operating system 704 and hosted VoIP PX software 706 (or some combination thereof) can comprise elements of the programming and the hosted VoIP PX software 706. Media, video, audio, or other data 707 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or Microsoft Lync® server software.

In another aspect, the user can enter commands and information into the computer 701 via client device or an input device (not shown). Example of such input devices comprise a keyboard, pointing device (e.g., a "mouse"), a microphone, a joystick, a scanner, tactile input devices such as gloves, and other body coverings, and the like. These and other input devices can be connected to the processing unit 703 via a human machine interface 702 that is coupled to the system bus 713, but also can be connected by other interface and bus structures, such as a parallel port, game port, IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709, and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown), which can be connected to the computer 701 via input/output interface 710. Any step and/or result of the methods can be output in any form to an output device. Such output can be any form of visual representation, including but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, softphone, client device, a server, a router, a network computer, a peer device or other common network node, and so on. Logical connections between the computer 701 and remote computing device 714a,b,c can be made via a network 715, such as a local area network (LAN) and or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of media manipulation software 706 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A fraud mitigation system for a messaging system network comprising:
    at least one activity storage system operatively connected to the messaging system network for recording messaging activity from a user account or device;
    at least one configuration storage system comprising configurable data for defining a plurality of fraud indicators;
    a fraud monitoring component operatively connected to the messaging system network, the at least one activity storage system, and the at least one configuration storage system for dynamically monitoring messages from the user account or device sent via the messaging system network to identify fraudulent messaging activity on an affected user account or device based on the defined plurality of fraud indicators; and
    at least one component of the fraud mitigation system operatively connected to a credential reset component for causing the issuance of new network access credentials to the affected user account or device during an in-process messaging activity; and
    a provisioning server operatively delivering the new network access credentials over a secure connection.

2. The fraud mitigation system according to claim 1, wherein the plurality of fraud indicators comprises at least one of an accumulated number of messages, a message type, a message destination, a message frequency, a temporal threshold, or a financial threshold.

3. The fraud mitigation system according to claim 2, wherein the message type is at least one of a short message service (SMS) message or a multimedia message service (MMS) message.

4. The fraud mitigation system according to claim 1, wherein identified fraudulent messaging activity is also recorded in the configuration storage system to further define the plurality of fraud indicators.

5. The fraud mitigation system according to claim 1, wherein the provisioning server authenticates the user account or device's access to the messaging system network.

6. The fraud mitigation system according to claim 5, wherein the provisioning server issues messaging tokens to authenticate the user account or device's access to the messaging system network.

7. The fraud mitigation system according to claim 1, wherein the at least one activity storage system comprises a message log database of messages sent and received by the user account or device on the messaging system network.

8. The fraud mitigation system according to claim 1, wherein the at least one configuration storage system records historical data comprising at least one of destination addresses, destination area codes, or destination countries.

9. The fraud mitigation system according to claim 8, wherein the at least one configuration storage system further records fraudulent messaging patterns that are based on one or more of a number of messages placed during a specific time period, a type of message placed during a specific time period, a number of messages placed from a specific user device or account, a number of messages placed from a specific group of user devices or accounts, or a destination of an outbound fraudulent message.

10. A method of fraud mitigation for a messaging system network comprising:
   accessing configurable data to define a plurality of fraud indicators;
   dynamically monitoring messages generated by a user account or device to identify fraudulent messaging activity based on one or more of the plurality of fraud indicators;
   determining the occurrence of fraudulent messaging activity within an affected user account or device; and
   applying the fraud mitigation action of issuing new network access credentials to the affected user account or device during an in-process messaging activity and delivering the new network access credentials over a secure connection.

11. The method of fraud mitigation according to claim 10, wherein a message type is at least one of a short message service (SMS) message or a multimedia message service (MMS) message.

12. The method of fraud mitigation according to claim 10, wherein the predefined fraud indicators comprise a number of messages placed during a specific time period, a type of message placed during a specific time period, a number of messages placed from a specific user account or device, a number of messages placed from a specific group of user accounts or devices, or destination of outbound messages.

13. The method of fraud mitigation according to claim 10, wherein the occurrence of fraudulent messaging activity is terminated by transmitting abort instructions to at least one of a mobile switching center, message service center, or the affected user account or device.

14. The method of fraud mitigation according to claim 10, wherein the new network access credentials are issued by a provisioning server in the messaging system network.

15. The method of fraud mitigation according to claim 14, wherein the new network access credentials issued to the affected user account or device comprises at least one of a new account username and password, a new messaging system network identification and password, or a new network access token.

16. The method of fraud mitigation according to claim 15, wherein the new network access credentials issued to the affected user account or device further comprises new network configuration instructions for accessing an alternative connection point, including a new IP address or DNS location.

17. The method of fraud mitigation according to claim 10, wherein the occurrence of fraudulent messaging activity is terminated by issuing a message termination instruction to the messaging system network's message service center or mobile switching center.

18. The method of fraud mitigation according to claim 10, wherein a fraudulent messaging activity destination location is recorded in historical data as a defined fraud identifier to prevent future messaging activity to that destination location.

19. A messaging system network having a fraud mitigation system comprising:
   at least one activity storage system operatively connected to the messaging system network for recording a subscriber account or device's messaging activity;
   at least one configuration storage system having configurable data for defining a plurality of fraud indicators;
   a fraud monitoring component executing on a computing device and operatively connected to the messaging system network, the activity storage system, and the configuration storage system; wherein the fraud monitoring component dynamically monitors the subscriber accounts or devices for fraudulent messaging activity using the plurality of fraud indicators; and wherein, and upon a determination that fraudulent messaging activity is occurring or has recently occurred on an affected subscriber account or device, employing
   a credential reset component for causing the issuance new network access credentials to the affected subscriber account or device during an in-process messaging activity; and
   a provisioning server operatively delivering the new network access credentials over a secure connection.

* * * * *